US008311763B2

(12) United States Patent
Schuh et al.

(10) Patent No.: US 8,311,763 B2
(45) Date of Patent: Nov. 13, 2012

(54) SYSTEM AND METHOD OF COMPENSATING FOR DEVICE MOUNTING AND THERMAL TRANSFER ERRORS

(75) Inventors: William C. Schuh, Delavan, WI (US); David P. Culberston, Bristol, WI (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

(21) Appl. No.: 12/239,189

(22) Filed: Sep. 26, 2008

(65) Prior Publication Data

US 2009/0024348 A1 Jan. 22, 2009

Related U.S. Application Data

(62) Division of application No. 10/930,223, filed on Aug. 31, 2004, now Pat. No. 7,447,607.

(51) Int. Cl.
*G01K 15/00* (2006.01)

(52) U.S. Cl. ........................................................ 702/130

(58) Field of Classification Search .................... 702/99, 702/130; 374/31, 133

See application file for complete search history.

(56) References Cited

U.S. PATENT DOCUMENTS

| | | | |
|---|---|---|---|
| 3,061,806 A | 10/1962 | Stevens | |
| 3,158,828 A | 11/1964 | Bargen | |
| 3,232,794 A | 2/1966 | Korton | |
| 3,281,518 A | 10/1966 | Stroud et al. | |
| 3,296,572 A | 1/1967 | Kleven | |
| 3,723,935 A | 3/1973 | Frazier et al. | |
| 3,878,724 A | 4/1975 | Allen | |
| 3,880,006 A | 4/1975 | Poduje | |
| 3,896,409 A | 7/1975 | Micheli et al. | |
| 4,052,744 A * | 10/1977 | Boothman et al. | 361/103 |
| 4,130,019 A | 12/1978 | Nitschke | |
| 4,147,061 A | 4/1979 | Wester et al. | |
| 4,210,024 A | 7/1980 | Ishiwatari et al. | |
| 4,218,916 A | 8/1980 | Mutziger | |
| 4,221,923 A | 9/1980 | Nagao et al. | |
| 4,242,907 A | 1/1981 | Kazmierowicz | |
| 4,303,984 A | 12/1981 | Hoevig | |
| 4,443,117 A | 4/1984 | Muramoto et al. | |
| 4,453,835 A | 6/1984 | Clawson et al. | |
| 4,482,261 A | 11/1984 | Dewey et al. | |
| 4,483,632 A | 11/1984 | Dewey et al. | |
| 4,537,516 A | 8/1985 | Epstein | |
| 4,541,734 A | 9/1985 | Ishizaka | |
| 4,559,954 A | 12/1985 | Murase | |
| 4,560,973 A | 12/1985 | Grimm et al. | |

(Continued)

FOREIGN PATENT DOCUMENTS

EP 1 079 219 A2 2/2001

(Continued)

*Primary Examiner* — Stephen Cherry

(74) *Attorney, Agent, or Firm* — Brinks Hofer Gilson & Lione

(57) ABSTRACT

A method of compensating a temperature measurement of a thermal device in a user environment as a function of a thermal transfer of the thermal device in a temperature measurement system. The method includes inputting thermal transfer parameters associated with heat transfer characteristics of the thermal device stored by a thermal transfer indicia. The method further includes measuring a signal of the thermal device during the temperature measurement and compensating the measured thermal device signal as a function of the thermal transfer function based on one of a plurality of predetermined specific thermal environments and one of a plurality of predetermined specific thermal errors associated with the thermal device.

19 Claims, 15 Drawing Sheets

U.S. PATENT DOCUMENTS

| | | | |
|---|---|---|---|
| 4,575,705 | A | 3/1986 | Gotcher |
| 4,623,266 | A | 11/1986 | Kielb |
| 4,660,993 | A | 4/1987 | Benedek |
| 4,721,942 | A | 1/1988 | Benedek et al. |
| 4,728,881 | A | 3/1988 | Evans et al. |
| 4,795,884 | A | 1/1989 | Carroll |
| 4,804,272 | A | 2/1989 | Schmitz |
| 4,826,738 | A | 5/1989 | Smeggil |
| 4,834,807 | A | 5/1989 | Burley |
| 4,875,042 | A | 10/1989 | Oku et al. |
| 4,934,831 | A | 6/1990 | Volbrecht |
| 4,958,936 | A | 9/1990 | Sakamoto et al. |
| 5,038,303 | A | 8/1991 | Kimura |
| 5,043,023 | A | 8/1991 | Bentley |
| 5,056,048 | A | 10/1991 | Seperant |
| 5,071,258 | A | 12/1991 | Usher et al. |
| 5,271,407 | A | 12/1993 | Popei et al. |
| 5,275,670 | A | 1/1994 | Smialek et al. |
| 5,332,315 | A | 7/1994 | Baker et al. |
| 5,340,216 | A | 8/1994 | Goldschmidt |
| 5,361,218 | A | 11/1994 | Tripp et al. |
| 5,484,206 | A | 1/1996 | Houldsworth |
| 5,675,118 | A | 10/1997 | Kortvelyessy |
| 5,741,073 | A | 4/1998 | Ribeiro et al. |
| 5,857,777 | A | 1/1999 | Schuh |
| 6,267,626 | B1 | 7/2001 | Hollander et al. |
| 6,300,554 | B1 | 10/2001 | Du et al. |
| 6,363,330 | B1 | 3/2002 | Alag et al. |
| 6,473,708 | B1 | 10/2002 | Watkins et al. |
| 2003/0028345 | A1 | 2/2003 | Watkins et al. |
| 2003/0179806 | A1 | 9/2003 | Danley |

FOREIGN PATENT DOCUMENTS

| | | |
|---|---|---|
| JP | 57-73640 | 5/1982 |
| WO | WO 91/14161 | 9/1991 |

* cited by examiner

SYSTEM AND METHOD OF COMPENSATING FOR DEVICE MOUNTING AND THERMAL TRANSFER ERRORS

CROSS REFERENCE TO RELATED APPLICATIONS

The present application is a divisional of U.S. patent application Ser. No. 10/930,223, filed Aug. 31, 2004, and which is hereby incorporated by reference in its entirety.

FIELD OF THE INVENTION

The invention relates generally to temperature management and more particularly to systems and methods for compensating for the thermal transfer error and other environmental heat transfer related aspects of a temperature-based system.

BACKGROUND

Many thermal devices generate a signal in response to a given environmental condition. For instance, a thermocouple has a voltage output due to a temperature difference from one end to the other end of the thermal device. Thermocouples are analog temperature sensors that utilize the thermoelectric properties of two dissimilar materials, typically metals, to generate an electromagnetic force (EMF) in proportion to a temperature gradient across the non-homogenous conjunction of the two materials. Common thermocouples used in temperature measurement comprise two metal wires of different thermoelectric properties called thermoelements connected at one end to form a "hot junction," also known as a "measuring junction." The other ends of the wires are connected to instrumentation such as a voltmeter to measure the EMF produced by the thermocouple. The wires are connected to the instrumentation at a known reference temperature to form a "reference junction" or a "cold junction".

There are many thermal errors associated with applying thermocouples and other such temperature sensors. For example, there are errors unique to the specific sensor, and application errors relating to the way the sensor is positioned or mounted in the user's application in the "field" (mounting error). Positioning or mounting error is often a major source of temperature sensor error in the user application. For instance, if the sensor mounting depth is shallow or if a temperature gradient exists near the tip of the sensor, there will be a heat flow "Q", which significantly affects the sensor output. This error can easily be whole degrees or tens of degrees and be the largest error in a thermal system.

In general, these error classifications in temperature sensors relate to the thermal heat transfer characteristics within the sensor and to the environment surrounding the sensor. For instance, a sheathed sensor measuring a thermal process has a heat flow from the process to the sensing element comprising a boundary layer heat flow from the process to the sensor sheath, a heat flow from the sheath to the sensing element, and other heat flow paths from the sheath to the cold end of the sensor. Each of the heat flow paths indicated provide another source of potential thermal error in the thermal sensing system if not adequately accounted for or otherwise compensated by the measurement system.

A sensor that is adequately immersed thermally into a process environment would have negligible difference in temperature between the sensing element and the process conditions. However, a sensor that is not adequately in contact with the process could have significant thermal errors.

For instance, a surface of a hot plate at 500° C. may be surrounded by room air so that just slightly above the surface of the plate would be air near room temperature. A surface sensor in such a condition would have a very sharp thermal gradient from the surface of the target to slightly above the sensing element (near ambient temperature) and so it is very likely that a difference exists between the sensing element and the target. In addition a probe placed onto a surface would act like a heat sink and locally cool the target further adding to the measurement error.

Although some current sensing approaches use calibration data to improve performance and some systems can be compensated by thermal analysis on a particular system, the thermal environment, mounting, application, and sensor specific errors still exist degrading thermal sensing system accuracy, process variability, and product quality.

Accordingly, there is a need for improved compensation for such thermal transfer paths in a thermocouple system and other temperature management systems. The improved compensation should minimize static and dynamic system errors by mitigating variations in the sensor output due to thermal transfer between the sensor and the thermal environment surrounding the sensor, and due to the thermal mounting error of the sensor in the user application. The improved compensation should also mitigate variations due to sensor specific errors particular to the sensor's construction.

SUMMARY

The following presents a simplified summary in order to provide a basic understanding of one or more aspects of the invention. This summary is not an extensive overview, and is neither intended to identify key or critical elements of the invention, nor to delineate the scope thereof. Rather, the primary purpose of the summary is to present some aspects of the invention in a simplified form as a prelude to the more detailed description that is presented later.

One aspect of the invention includes a thermal sensor system that includes a sensor for measuring a temperature within a user environment and providing a sensor signal indicative of the sensor measured temperature. The system also includes a thermal transfer indicia associated with the sensor. The thermal indicia provide thermal transfer parameters for compensating the sensor measured temperature as a function of the thermal transfer between the sensor and the user environment. The thermal transfer parameters are associated with predetermined thermal transfer information for characterizing a transfer of thermal energy between the sensor and the user environment.

Another aspect of the invention includes a temperature measurement error compensation system with a temperature sensor for use within a sensor environment within a user application that generates a sensor signal. The system also includes a thermal transfer indicia associated with the sensor for providing thermal transfer parameters associated with a thermal transfer characteristic between the sensor and the sensor environment within the user application. The system further includes a communication interface for providing the thermal transfer parameters to a temperature measurement system operably coupled to the communication interface. The temperature measurement system is configured to determine a compensated sensor signal as a function of the provided thermal transfer parameters.

In yet another aspect, the invention includes a measurement system for compensating thermal transfer between a thermal device and a user environment surrounding the thermal device and within a user application. The system includes a thermal device that may be positioned within the user environment and that provides a thermal device signal. The system also includes a thermal transfer indicia associated with the thermal device for providing thermal transfer parameters of a thermal transfer function that at least partially describes the relationship between the temperature of the thermal device and the thermal transfer between the thermal device and the user environment. The system further includes a temperature measurement compensation device for receiving the thermal transfer parameters and for generating a compensated measured temperature as a function of the thermal transfer between the user environment and the thermal device.

In still another aspect, the invention includes a method of compensating a temperature measurement of a thermal device in a user environment as a function of a thermal transfer of the thermal device in a temperature measurement system. The method includes inputting thermal transfer parameters associated with heat transfer characteristics of the thermal device stored by a thermal transfer indicia. The method also includes measuring a signal of the thermal device during the temperature measurement and compensating the measured thermal device signal as a function of the thermal transfer function.

Further aspects of the invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

Corresponding reference characters indicate corresponding parts throughout the several views of the drawings.

DETAILED DESCRIPTION

Figure 1:
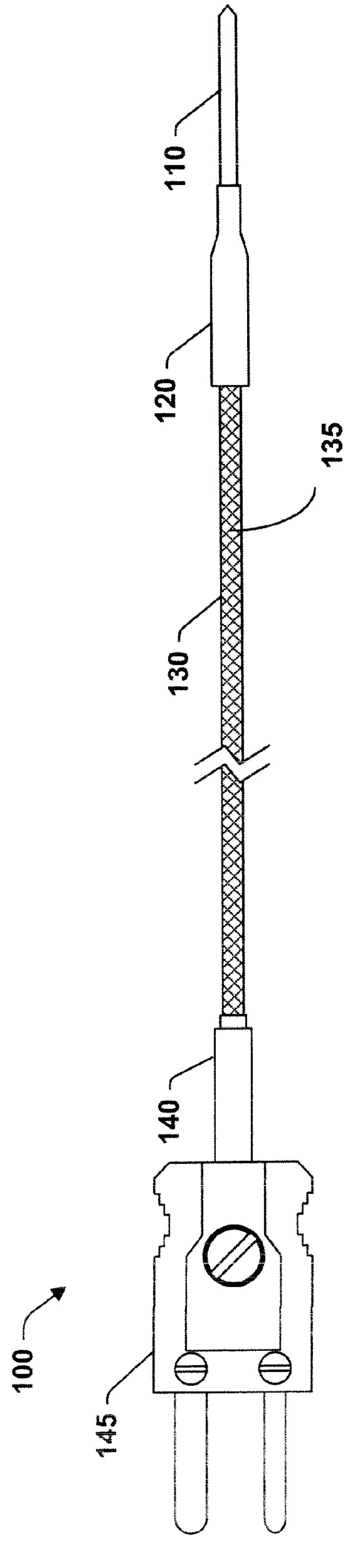
FIG. 1 is a diagram illustrating a conventional thermocouple device such as may be used in a temperature monitoring system.

The following description is merely exemplary in nature and is in no way intended to limit the invention, its application, or uses.

One or more embodiments of the invention relate to a thermal compensation system for compensating for the thermal transfer in a thermal device measurement or control system. The compensation system utilizes predetermined and stored parameters associated with the thermal device to compensate the thermal transfer within the measurement system reflected in the output signal of the sensor. The thermal transfer function may then be analyzed to determine parameters that may be referenced or directly stored by thermal transfer indicia accompanying the thermal device. The stored parameters are retrieved by the measurement or control system and used to reconstruct the thermal transfer function of the thermal measurement system. The thermal transfer function is then used to compensate the signal of the thermal device based on the thermal transfer function, thus compensating for such thermal transfer paths in a thermal device while mitigating variations due to thermal transfer within and surrounding the thermal device, thereby minimizing static and dynamic system errors.

As discussed earlier, there are many thermal errors associated with applying thermal devices such as thermocouples or other temperature sensors in a user's application. There are errors unique to the specific thermal device, and application errors relating to the way the thermal device is used in the user's application that include errors related to the mounting of the thermal device in the user's application in the "field" (mounting error). These thermal errors may result in significant errors in the signal of a temperature measurement system in the user application. For example, if a mounting depth for a thermal sensor is shallow and the sensor only makes point contact and has only a slight contact pressure, a loose fit, a poorly matched contact surface shape, or if a temperature gradient exists near the tip of the sensor, there will be a heat flow "Q", which significantly affects the sensor signal. In these and other similar situations, then, the error can be the largest error in a thermal system. In other situations, the error may be relatively small but still significantly degrade the process variability.

In general, these thermal errors in thermal systems relate to the thermal heat transfer characteristics between the sensing element and the environment surrounding the thermal device typically comprising a sheath to protect a sensing element. For instance, a sheathed sensor measuring a thermal process has a heat flow between the process and the sensing element that can be modeled as a circuit of thermal conductors. The circuit of thermal conductors may correspond to: a boundary layer conductor from the process to the sensor sheath, a conductive element from the sheath to the sensing element, and then more conductive elements along the sheath to the cold end of the sensor. Each of the heat flow paths indicated by a conductive element above provide a potential source of thermal error in the thermal sensing system unless each is adequately compensated by the measurement system.

In a smart temperature measurement system, it is desirable to develop and transmit as much information as possible and thereby create knowledge in the system. One way to do this is to identify parameters that describe the thermal device or a sensing system and communicate the information (preferably together with the thermal device) as parameters to the measurement system to make the thermal device "intelligent." This system can then use this parametric information to create knowledge based algorithms. As an example, various thermal transfer functions and thermal models of a sensor in a process are presented.

The above examples illustrate that measurement errors can be the result of the heat flow in a thermal system. By using a thermal model, some of this error can be calculated and corrected. A thermal model requires that the thermal parameters discussed be known. For example, in a nodal mesh the various thermal conductors are determined to provide a method of determining the temperature of the various nodes based on an energy balance over all the nodes. In a temperature measurement system, the thermal path from the process to the sensing element and any shunting heat transfer from the process to the external ambient due to the presence of the sensor, would also be modeled as a thermal conductor. Fortunately, the magnitude of the thermal conductors for a particular sensor or family of sensors (e.g., thermal sensors) can be determined ahead of time, and provided (e.g., stored with the sensor) as characteristic parameters of the sensor in much the same way as calibration data. Thereby, the added predetermined thermal information provided by thermal modeling makes the sensor a smart sensor to correct errors in the measurement of a smart sensing system.

A thermal transfer compensation system can then be realized by gathering thermal device application and environmental specific thermal information from a user of a thermal device, which may be combined with thermal device specific thermal information from, for example, the manufacturer of the thermal device. In a temperature sensor, for example, the specified thermal information might be sensor positioning data including mounting method or system, mounting position relative to a heat source or an application being measured such as a heater, a sensor mounting depth, ambient temperature, sensor contact pressure, the shape of the target mounting relative to the probe tip of the selected sensor, and the expected operating temperature. The thermal transfer model would then be analyzed to provide a thermal transfer function of the change in output signal as a function of the thermal environmental surrounding the thermal device and the user application for the thermal device that may include a mounting or method of positioning the thermal device in a mechanical or chemical manufacturing system of the user.

The thermal transfer function can be stored or recorded in any number of ways, such as a table of empirical data of output versus sensed temperature, a mathematical function of heat transfer as a function of temperature, or other parameters such as fitted data coefficients of the mathematical thermal transfer function. However, embodiments of the thermal device in the thermal system of the invention include parameters relating to the thermal transfer characteristics of a specified part number sensor from the manufacturer, for example. These parameters then, together with information for a given user application, permit the information to be used in the application to compensate for temperature measurement errors due to thermal transfer in the sensor system using thermal transfer modeling.

By contrast to a conventional system, one or more embodiments of the invention described herein include providing parameters associated with a thermal device of the thermal transfer modeling for correcting or compensating for thermal errors in thermal devices due to heat transfer between the thermal device and the environment in and around the thermal device. Thus, some embodiments of the invention provide one or more means to store and communicate predetermined information to a thermal model used to model or characterize the various heat transfer paths between the thermal device and the sheath, the thermal device mounting, the environment surrounding the thermal device, and the application itself.

In one embodiment, the system includes a thermal device such as a heating device or a sensing device. For example, a thermal sensor system may include a thermocouple, an RTD, a thermistor, a diode, or a transistor that may reside within a sensor environment and utilized within a user application. The thermal device or system may also include thermal transfer indicia associated with the thermal device for storing or referencing a set of thermal transfer parameters of the thermal transfer between the sensor and the user environment in the user application.

The compensation system may be used in a thermal transfer compensation device or instrument (e.g., a computerized temperature, pressure, flow, or chemical measuring instrument). Such a compensation device may be operably coupled to a thermal device or system and operable to use the parameters stored by the thermal transfer indicia. Thermal transfer indicia may be stored in any type of suitable media including an EPROM, an EEPROM, a barcode, an RFID tag, a virtual storage location on a network, a memory device, a computer readable medium, a computer disk, and a storage device operable to communicate information of the thermal transfer related to the sensor system. After retrieving the stored indicia, the compensation device reconstructs the thermal transfer function that may then be used to compensate the temperature measurement errors reflected in the system output due to the various thermal transfer paths of the thermal device system.

Optionally, the thermal transfer modeling is accomplished, in accordance with one aspect of the invention from thermal information input from the user environment surrounding a specific thermal sensor. The thermal information may be stored in an electrically erasable programmable read only memory (EEPROM) chip that is integral to the user's sensor. In one exemplary application, the temperature sensor is connected to an electronic instrument capable of retrieving the stored information from the EEPROM and using the retrieved thermal parameters to reconstruct the thermal transfer function for calculating a correction value as a function of the indicated temperature. This calculated correction value is then used to compensate or correct the indicated temperature with respect to thermal transfer errors modeled in the measurement system.

In order to appreciate one or more features of embodiments and implementations of the invention, several exemplary implementations of the thermal transfer compensation systems, the thermal device and sensor systems, a sensor measurement system, and a thermal transfer model are hereinafter illustrated and described with respect to the following figures. Although embodiments and implementations will be shown and described in the examples and figures using thermocouples, a variety of other thermal devices such as heating elements and transducers for measuring temperatures such as Resistance Temperature Detectors (RTDs), and thermistors are also anticipated in the context of embodiments of the invention, wherein thermal transfer error may be compensated from the sensor output signal.

Figure 2:
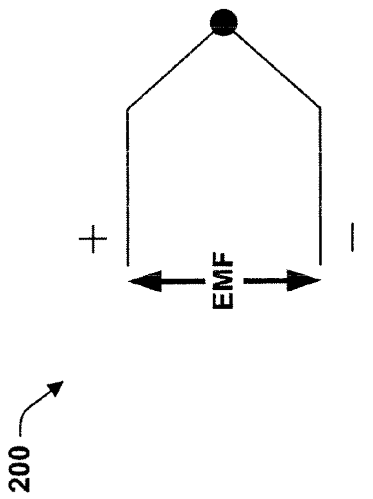
FIG. 2 is an accompanying schematic symbol of the prior art thermocouple of FIG. 1, and the polarity of an EMF provided by the device.

FIG. 1 illustrates a conventional thermocouple device 100, such as may be provided by a thermocouple manufacturer and used in a temperature monitoring system. FIG. 2 illustrates an accompanying schematic symbol 200 of sensor or thermocouple device 100 of FIG. 1. Most common thermocouples are temperature measuring devices or sensors comprising two dissimilar metals connected together at one end, called the hot junction. The two metals have a polarity with respect to each other and one of these is referred to as the positive leg and the other as the negative leg. The two free ends, called the cold end, provide a voltage (EMF) proportional to the temperature difference between the hot end and the cold end.

Referring back to FIG. 1, the conventional thermocouple typically has a stainless steel sheath 110 for protection over the hot junction that may be potted therein (e.g., a ceramic, or epoxy potting material), together with a thermocouple transition 120 (e.g., stainless steel) to protect the transition to a length of a high temperature insulated leadwire 130. Leadwire 130 may also have a length of a heat shrink protection 135 and a label 140 before it terminates in a mini-plug connector 145.

Figure 3:
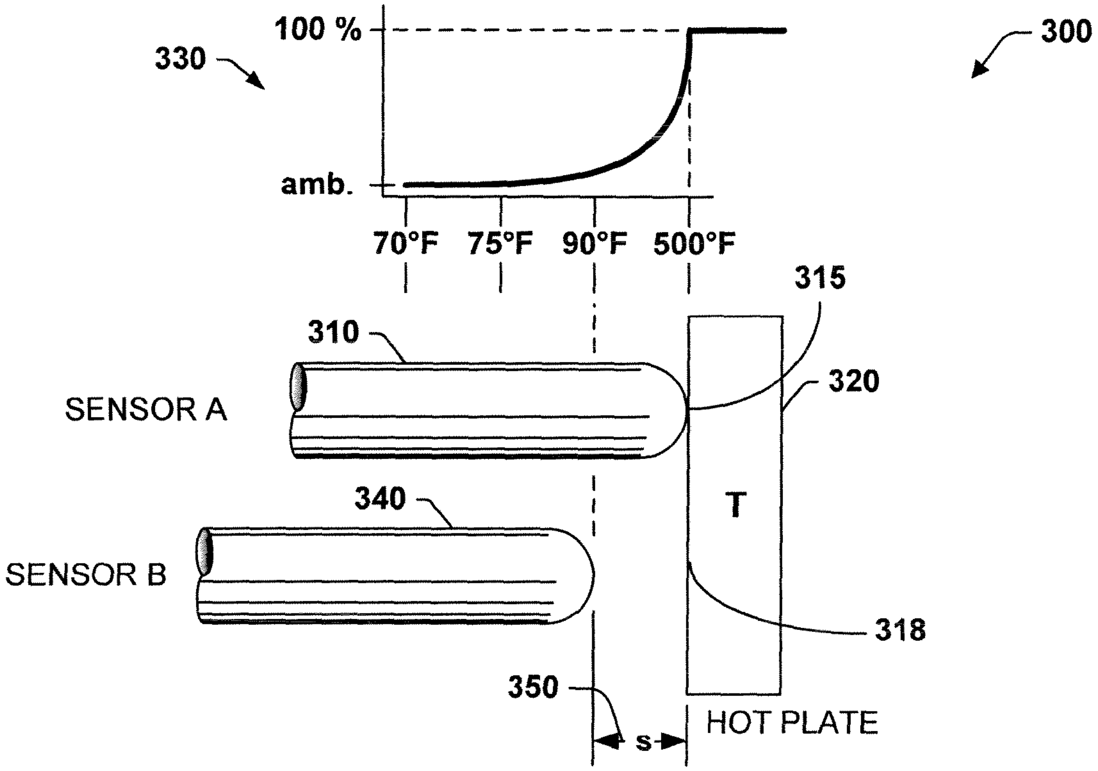
FIG. 3 is a diagram of two exemplary thermal sensors and a hot plate, a first sensor making a point contact with the hot plate and a second sensor positioned a distance away from the plate, and illustrating the effect of a sharp thermal gradient on the sensors and the thermal errors that may result in a temperature measurement.

FIG. 3 illustrates a sensor system 300 and a corresponding graph 330 that illustrate the effect of a sharp thermal gradient on two exemplary similar thermal sensors and the thermal errors that may result in a temperature measurement. As discussed, the degree of immersion of a sensor into the process environment can greatly affect the thermal gradient across the sensing element area of a sensor and the error in the indicated temperature. System 300 illustrates an exemplary sensor A 310 having a single point contact 315 with a surface 318 of a thermal source T 320 that in one embodiment may be a hotplate. In the example, surface 318 of thermal source T 320 is at a temperature of 500° F. in a room where the ambient air temperature is 70° F. as illustrated in graph 330. Graph 330 illustrates the temperature versus distance from thermal source T 320. Thus, slightly off surface 318 that is a temperature of 500° F., the surrounding air temperature may sharply transition to near ambient as illustrated by thermal graph 330.

Another exemplary sensor B 340 is located a short distance "s" 350 from surface 318 of the thermal source T 320. Because sensor A 310 only provides point contact 315 with the thermal source T 320, and a sharp thermal gradient exists near surface 318 of the thermal source T 320, sensor A 310 may lose some of the sensing heat to the ambient air and only indicate, for example, about 450° F. of the 500° F. surface temperature. Thus, sensor A 310 may lose about 10% of the actual temperature of the target (intended) thermal source T 320 in these conditions. The error between the actual temperature and measured temperature at the tip of a sensor may provide some measure of the "tip sensitivity" of the sensor. Sensor B 340, at distance "s" 350 from the thermal source T 320, senses the air temperature of about 90° F. at its tip, but may also lose about 10% of this temperature to the ambient surrounding air, resulting in a reading well below 90° F.

A sensor placed between the positions of sensor A 310 and sensor B 340 may demonstrate a light or very poor contact with thermal source T 320. Although sensor A 310 may be poorly immersed in the process measurement of surface 318, sensor B 340 is positioned at a distance away from surface 318 and is therefore less immersed or equipped to measure the temperature of surface 318. In addition, a sensing probe placed against surface 318 of thermal source T 320 would act like a fin of a heat sink thereby locally cooling thermal source T 320 further adding to the measurement error.

Figure 4:
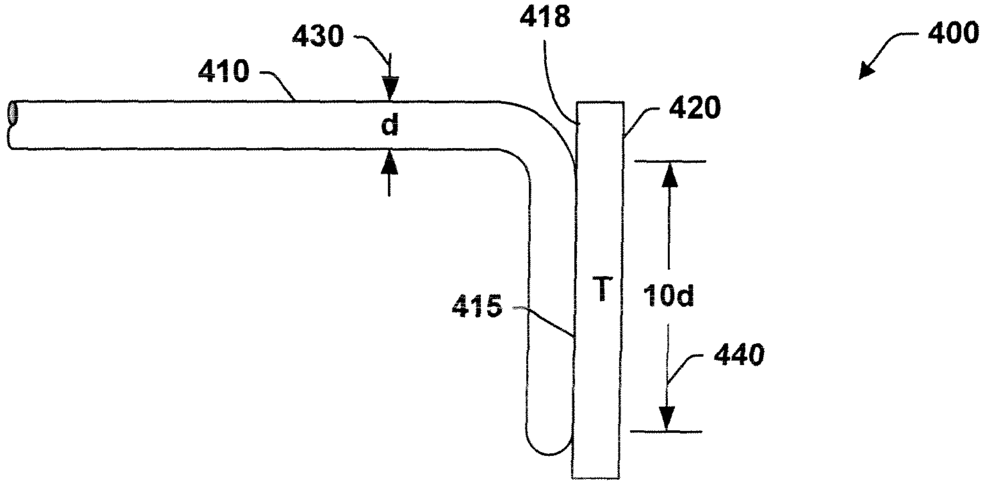
FIG. 4 is a diagram of a sensor making a line contact with a thermal source such as a hot plate.

FIG. 4 illustrates a sensor system 400 having a sensor 410 making a line contact 415 with a surface 418 of a thermal source T 420. Sensor 410 has a diameter "d" 430 and contacts surface 418 of thermal source T 420 for a length of ten diameters "10d" 440 of sensor probe 410. In this mounting configuration of sensor 410, sensor 410 may provide an improvement in temperature measurement accuracy over that of sensor A 310 of FIG. 3, and produce a thermal error of, for example, about 1-2% of the actual temperature when measuring thermal source T 420. Thus, even in a more idealized mounting situation, measurement errors may still be experienced as a result of the heat flow in a system. This heat flow may be due to the mounting configuration, the user environment, the user application, or the specific sensor selected for the application.

In FIGS. 5A, 5B, 6A, 6B, 7A and 7B, several thermal models will be illustrated in thermal device applications wherein the thermal device is a sensor sensing convective, conductive and radiative heat transfer as the predominant modes of heat transfer for the application.

Figure 5A:
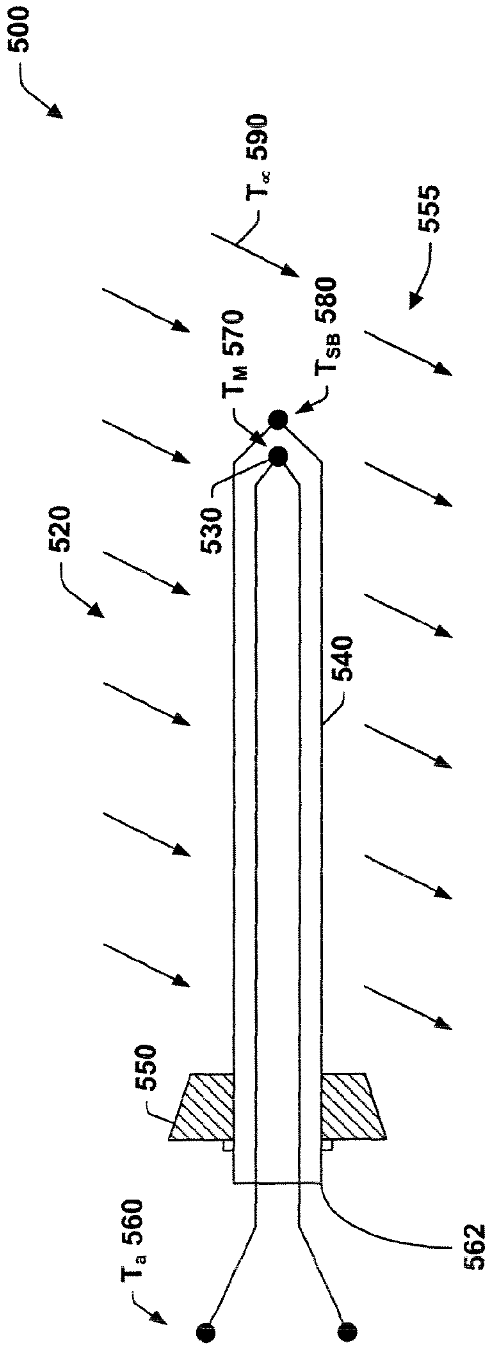
FIG. 5A is a diagram of a sensor in a predominately convective heat transfer user application according to one embodiment of the invention.
Figure 5B:
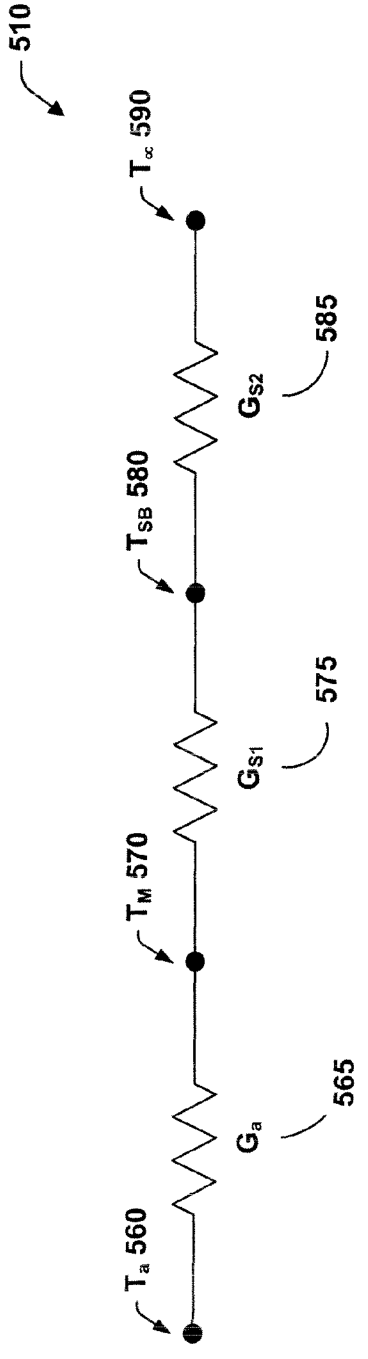
FIG. 5B is a one dimensional thermal conductance model of the sensor in the predominately convective heat transfer user application of FIG. 5A.

FIG. 5A illustrates a temperature sensor immersed in a thermal process of a predominately convective heat transfer user application 500. FIG. 5B illustrates a convective thermal conductance model 510 of a sensor 520 in a predominately convective heat transfer user application 500 as in FIG. 5A. The exemplary convective thermal conductance model 510 may be modeled and illustrated as a series of thermal nodes connected with conductors.

In the convective user application 500 of FIG. 5A and convective thermal conductance model 510 of FIG. 5B, the exemplary thermocouple sensor 520 has a measuring element 530 that is covered and protected by a sheath 540. Sensor 520 is positioned or held by a mounting 550 for immersion within a process free stream 555. Sensor 520 includes a cold end 562 that is not immersed in process free stream 555 and is at an ambient temperature.

In convective conductance model 510, there are four thermal nodes and associated temperatures identified. $T_a$ 560 is an ambient temperature at cold end 562 of sensor 520, $T_M$ 570 is a temperature at measuring element 530, $T_{sb}$ 580 is a temperature of sensor sheath 540 at a process boundary, and $T_\infty$ is a process temperature of process free stream 555. These thermal nodes (e.g., 560, 570, 580, and 590) are connected with heat transfer conductors. These conductors include thermal conductor $G_{s2}$ 585 from process free stream 555 to sheath 540, thermal conductor $G_{s1}$ 575 from sheath 540 to measuring element 530, and thermal conductor $G_a$ 565 from measuring element 530 to cold end 562 of sensor 520.

Figure 6A:
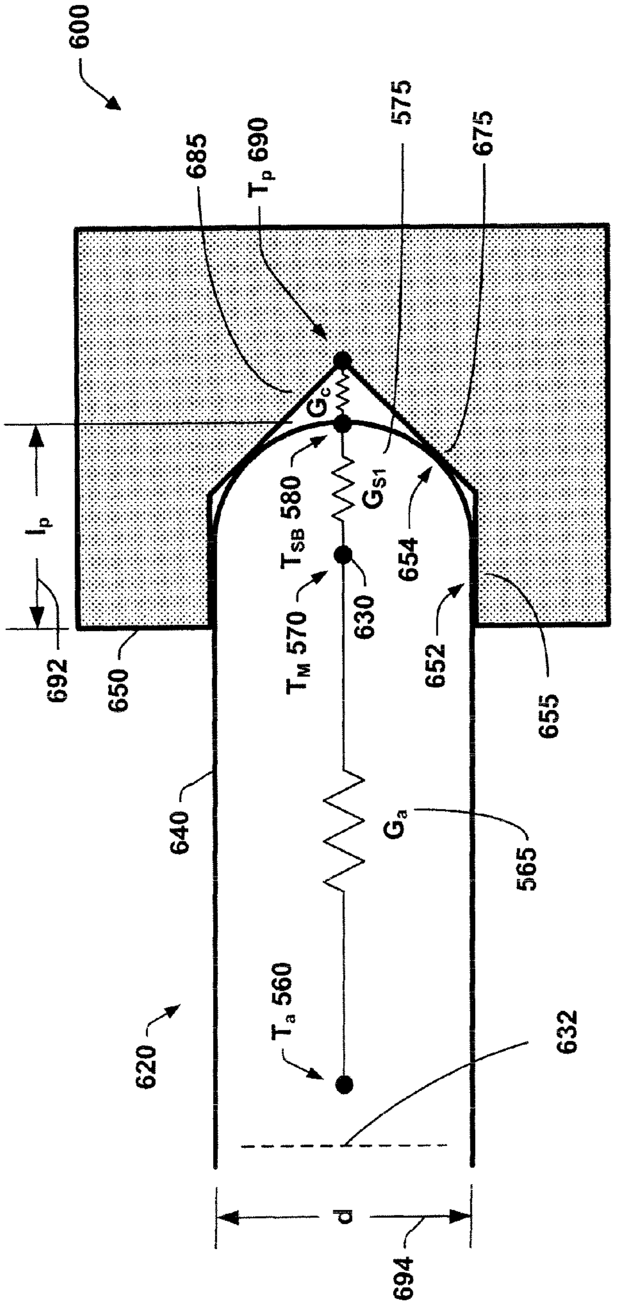
FIG. 6A is a diagram of a sensor in a predominately conductive heat transfer user application according to one embodiment of the invention.
Figure 6B:
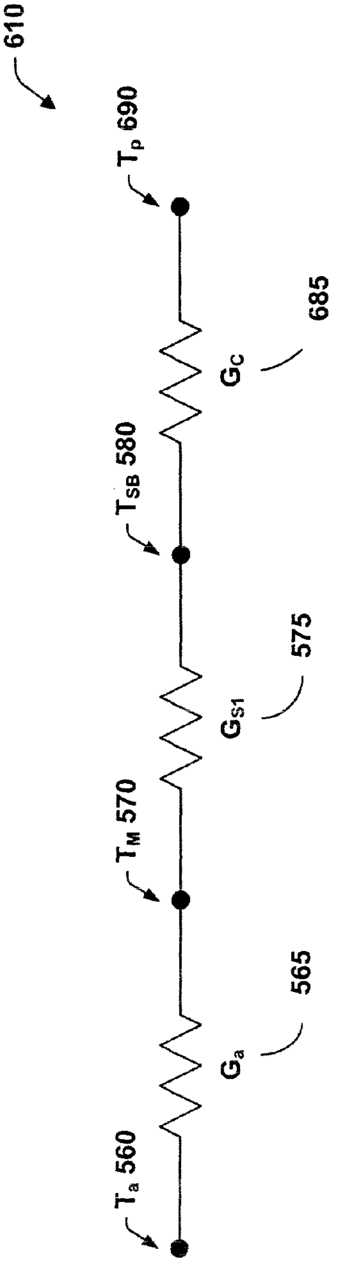
FIG. 6B is a one dimensional thermal conductance model of the sensor in the predominately conductive heat transfer user application of FIG. 6A according to one embodiment of the invention.

FIG. 6A illustrates a temperature sensor in a predominately conductive heat transfer user application 600. Such a system is typical of contact sensors where a sensor sheath is mechanically held onto a solid surface. In FIG. 6A, the round tip of a sensor is in contact with a machined receptacle, such as a drilled hole, in the target solid (thermal source body) that is at a temperature $T_P$ 690. FIG. 6B illustrates a conductive thermal conductance model 610 of the sensor in the predominately conductive heat transfer user application 600 of FIG. 6A.

In the conductive user application 600 of FIG. 6A and conductive thermal conductance model 610 of FIG. 6B, an exemplary thermocouple sensor 620 has a measuring element 630 that is covered and protected by a sheath 640. A tip 675 of sensor 620 is held to a machined receptacle 655 in a target solid 650 at an immersion depth $I_p$ 692 by a radial surface of a contact 652 and a line (ring) of a contact 654 on a face of sensor 620. In conductive conductance model 610, thermal nodes include: $T_a$ 560 an ambient temperature at a cold end 632 of sensor 620, $T_M$ 570 a temperature at measuring element 630, $T_{sb}$ 580 a temperature of sensor sheath 640 at the process boundary, and $T_P$ 690 a process temperature of target solid 650. These thermal nodes (e.g., 560, 570, 580, and 690) are connected with heat transfer conductors, a thermal contact resistance, $G_c$ 685, between outer sheath 640 of sensor 620 and target solid 650 process, $G_{s1}$ 575 from sheath 640 to temperature measurement element 630, and $G_a$ 565 from measuring element 630 to cold end 632 of sensor 620. Thermal contact resistance, $G_c$ 685 reflects a parallel combination of the contact resistances of radial surface contact 652 and line contact 654 between sensor 620 and target solid 650.

Heat is transferred between target solid 650 and sensor sheath 640 through contact resistance $G_c$ 685. The heat then transfers from sensor sheath 640 to measuring element 630 through thermal conductor $G_{s1}$ 575, then through sensor 620 and sheath 640 to the ambient conditions via $G_a$ 565. Although $G_c$ 685 is represented as only a single conductor, $G_c$ 685 may actually be multiple such conductors including radiation and convection conductive components depending on the application (as will be discussed in association with FIGS. 7A and 7B). Further, $G_c$ 685 is dependent on the contact area that sensor 620 makes with target solid 650 and a force applied to maintain contact.

The area of contact is based on the geometry of sensor 620, and the geometry of the machined receptacle 655 in the application target solid 650. More specifically, the area of contact is based on the similarity or matching of sensor 620 and the application geometry. In many user applications, a more significant error is related to a depth of immersion in the application and the tip sensitivity of sensor 620. For example, when a depth of immersion $I_p$ 692 is small with respect to a sensor diameter d 694, increased thermal errors may result. This effect is called thermal shunting. Although compensation using characterization of the device geometry and tip sensitivity may eliminate much of the thermal shunting error, characterization of the application geometry and the application temperature profile according to embodiments of the invention eliminate or minimize these errors.

Figure 7A:
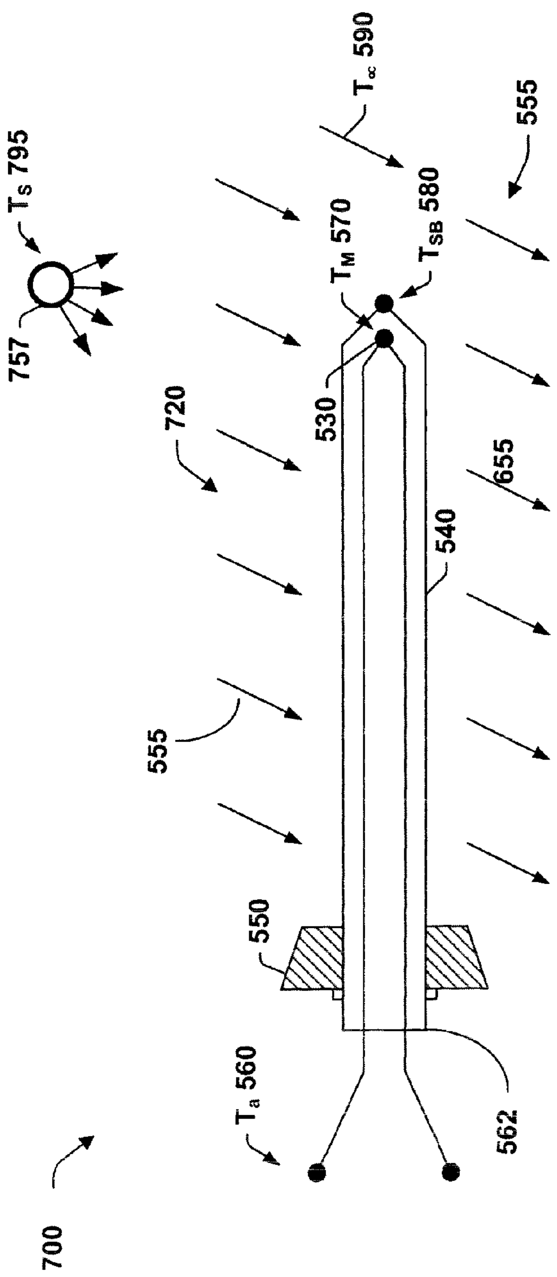
FIG. 7A is a diagram of a sensor in a predominately convective heat transfer user application that also has a radiative heat transfer component according to one embodiment of the invention.
Figure 7B:
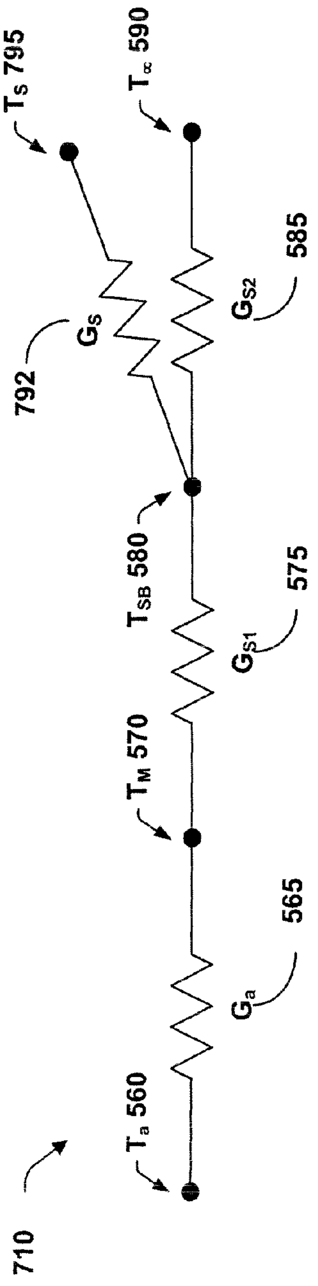
FIG. 7B is a thermal conductance model of the sensor in the convective and radiative heat transfer user application of FIG. 7A according to one embodiment of the invention.

FIG. 7A illustrates a temperature sensor in a predominately convective heat transfer user application 700 also having a radiative heat transfer component, e.g., a convective/radiative application. FIG. 7B illustrates a convective/radiative thermal conductance model 710 of the sensor in the convective and radiative heat transfer user application 700 of FIG. 7A. For instance, an application may use a furnace heated by resistance heating elements and use forced air to convect the heat to the furnace load. In this type of user application, the heating elements will radiate heat as defined by thermal transfer quotient Q to the sensor based on the equations:

$$Q \text{ is a function of } F, A, \epsilon \text{ and } (\Delta T)^4; \quad [1]$$

or $$Q=f(F,A,\epsilon,\Delta T); \quad [2]$$

where F is the view factor, A is the area of the sensor exposed to the radiative source, $\epsilon$ is emissivity, and delta T is the differential between the source temperature and the sheath temperature. Whereas the sensor geometry is a device characteristic, the position and distance of the sensor relative to the heating element and the exposed area of the sensor are based on application characteristics, which may be harvested from the user in generating an improved thermal model.

In the convective/radiative user application 700 and convective/radiative thermal model 710, an exemplary thermocouple sensor 720 includes the measuring element 530 that is covered and protected by sheath 540. Sensor 720 is held by mounting 550 for immersion within process free stream 555 and exposed to a radiative source 757. In the convective/radiative conductance model 710, thermal nodes include: $T_a$ 560 the ambient temperature at cold end 562 of sensor 720, $T_M$ 570 the temperature at measuring element 530, $T_{sb}$ 580 the temperature of sensor sheath 540 at the process boundary, $T_\infty$ 590 the process temperature of conductive process (free stream) 555, and $T_s$ 795 a temperature of radiative source 757. These thermal nodes (e.g., 560, 570, 580, 590, and 795) are connected with heat transfer conductors, conductor $G_{s2}$ 585 from convective process 555 to sheath 540, a conductor $G_s$ 792 from radiative source 757 to sheath 540, conductor $G_{s1}$ 575 from sheath 540 to temperature measurement element 530, and conductor $G_a$ 565 from the measuring element 530 to cold end 562 of sensor 720.

Figure 8A:
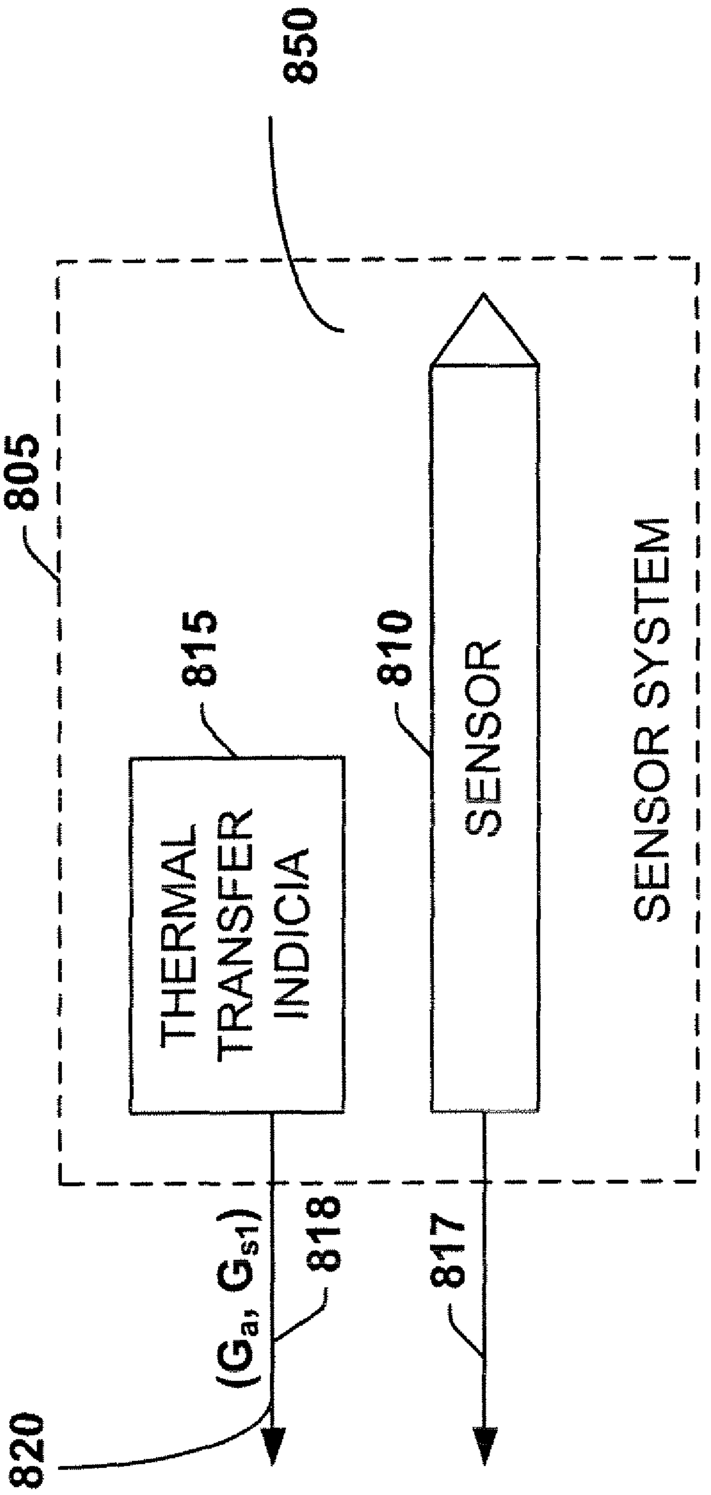
FIG. 8A is a diagram of an exemplary sensor system for providing predetermined information parameters that may be used for compensating for the sources of heat transfer between a sensor and the user environment surrounding the sensor in accordance with one embodiment of the invention.
Figure 8B:
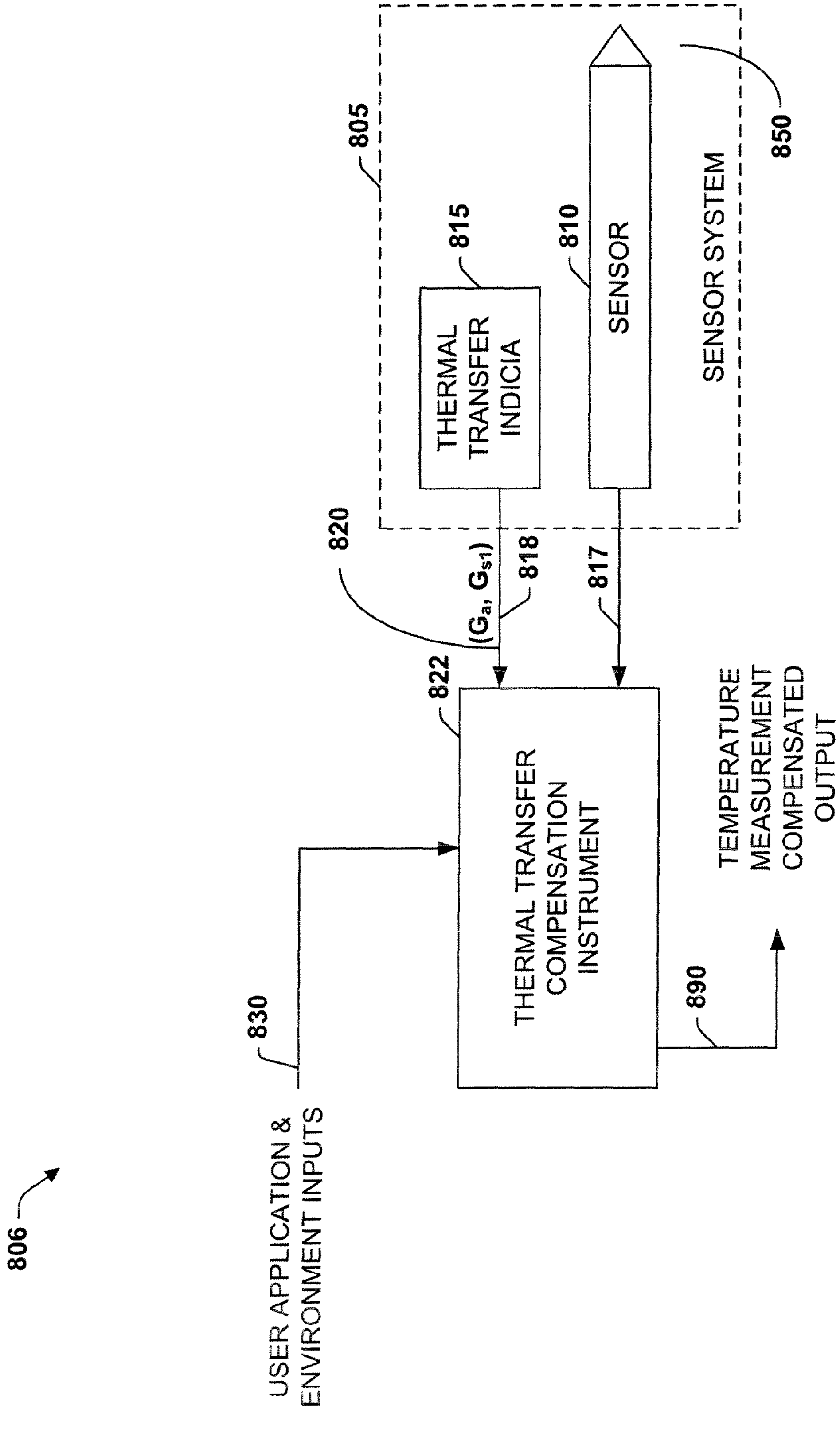
FIGS. 8B-8C are diagrams of exemplary thermal transfer compensation systems such as may be used in association with the sensor system of FIG. 8A for compensating for the sources of heat transfer between a sensor and the user environment surrounding the sensor including the sensor mounting and the heat transfer within the sensor in a monitoring system in accordance with one embodiment of the invention.
Figure 8C:
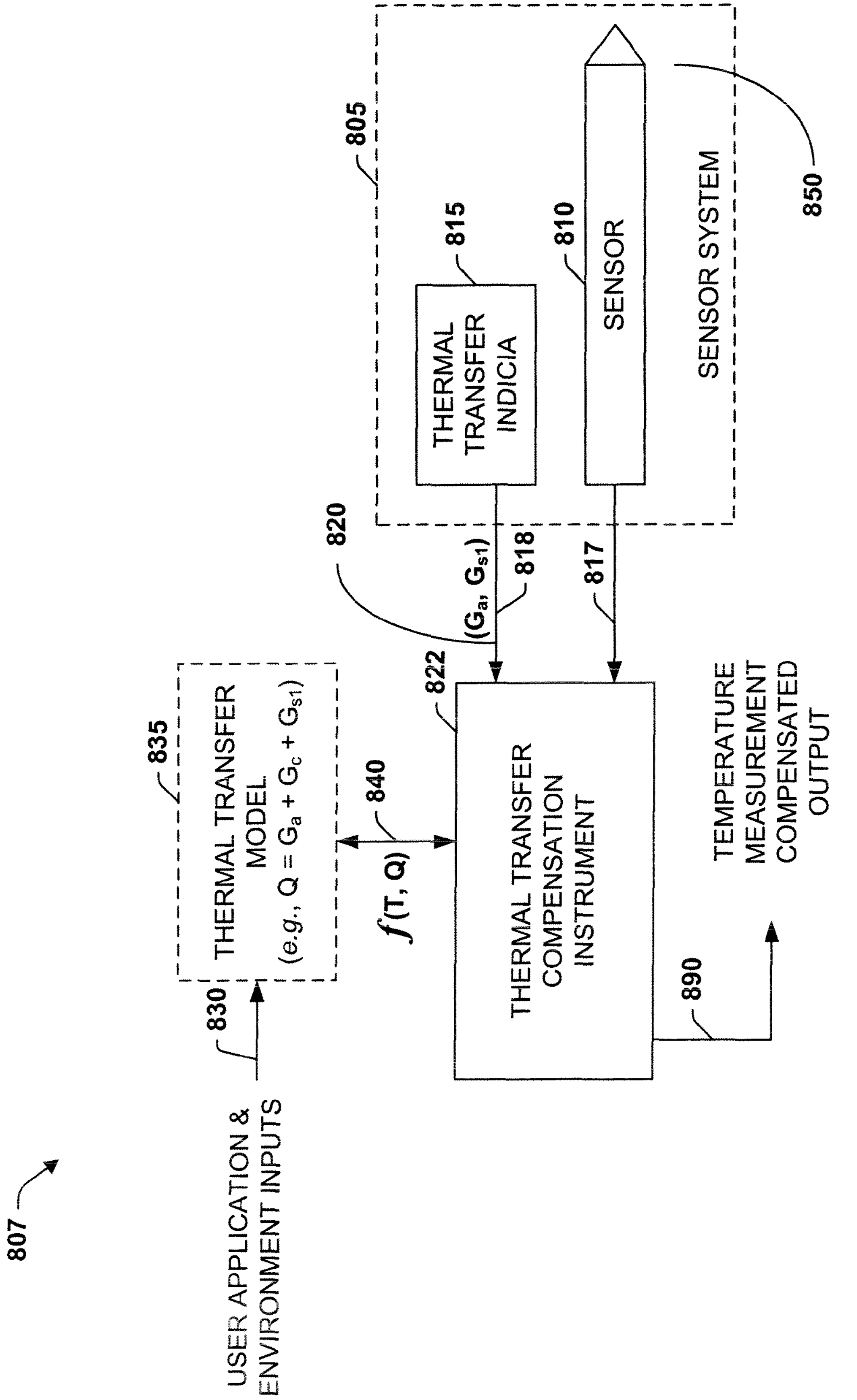

FIGS. 8A-8C illustrate diagrams of an exemplary sensor system 805 of FIG. 8A such as may be used in exemplary temperature measurement error compensation systems 806 and 807 of FIGS. 8B and 8C, respectively, in accordance with some embodiments of the invention. Sensor system 805 provides predetermined information in the form of thermal transfer parameters stored as thermal transfer indicia and may be used by exemplary compensation systems 806 and 807 to compensate for measurement errors due to the heat transfer in and around a sensor of a temperature monitoring system. Note, compensation systems 806 and 807 are included and illustrated for a further understanding of the possible context and as an exemplary measurement and compensation system wherein the sensor system of embodiments of the invention may be utilized. It is anticipated that other systems may also utilize the thermal transfer parameters for compensation such as may be required for controlling a heating and/or cooling system.

Sensor system 805 of FIG. 8A includes a sensor 810, and a thermal transfer indicia 815 associated with sensor 810. Sensor system 805 has a sensor output or signal 817 for temperature measurement indications, for example, to a thermal monitoring system. A thermal transfer indicia 815 includes distinctive marks, stored data or a reference to data in a storage device capable of retaining a set of sensor specific thermal transfer parameters 818 associated with the heat transfer between sensor 810 and a user environment 850 surrounding sensor 810 within the user application. By way of one example, indicia 815 is associated with sensor 810 or a class of sensors 810, as will be further appreciated. As indicated, thermal transfer indicia 815 may include an indicia storage system or device (not shown) associated with the specific user selected sensor (not shown). Indicia storage system may, by way of example, include an EPROM, an EEPROM, a barcode, an RFID tag, a virtual storage location on a network, a memory device, a computer readable medium, a computer disk, and another such storage device operable to communicate information of the sensor. A reference to thermal transfer parameter data may include a data storage reference, a database reference, a network reference, a sensor or file reference, a serial number, a model number, a batch number, or a reference number.

For example, sensor thermal transfer parameters 818 stored within indicia 815 may be suitably employed by the user or in a thermal compensation device or instrument of a temperature measurement system (e.g., such as 806, 807), together with additional application and environment inputs, for modeling the heat transfer between sensor 810 and surrounding user environment 850. The manufacturer of sensor 810 may supply a set of these parameters using a similar model of a functional relationship of the thermal transfer characteristics of sensor 810. These parameters associated with the heat transfer are then stored by the sensor manufacturer in thermal transfer indicia 815.

A thermal transfer functional relationship, for example, may be represented as a thermal transfer function, such as $$1/G=1/G_a+1/G_c+1/G_{s1}; \quad [3]$$

and $$Q^{\bullet}=G^{*}\Delta T; \quad [4]$$

where $Q^{\bullet}$ is the heat rate and G is the equivalent series conductor. In this way, the manufacturer is able to communicate predetermined thermal transfer information of sensor 810 that is useful later as modeling inputs to the user via sensor thermal transfer parameters 818. In the exemplary implementation, the sensor manufacturer is essentially supplying, for example, conductor parameters $G_a$ and $G_{s1}$ of the model, which together with the user supplied additional application and environment inputs, makes provision for further optional modeling of the Gc conductor as previously discussed. With these inputs, an improved thermal transfer model may be obtained for a more accurate temperature measurement in the user's particular environment.

FIGS. 8B-8C illustrate exemplary temperature measurement error compensation systems 806 and 807, respectively, such as may be used in association with sensor system 805 in accordance with some embodiments of the invention. Systems 806 and 807 may be used for compensating for the sources of heat transfer within and surrounding sensor 810 and the user environment in a monitoring system. Systems 806 and 807 receive sensor temperature measurement signal 817 from sensor 810, and retrieve an indicia output signal 820 including sensor thermal transfer parameters 818 stored by thermal transfer indicia 815 used for compensating temperature measurement errors related to thermal transfer sources and sensor 810.

FIG. 8B, for example, illustrates an exemplary temperature measurement error compensation system 806 for compensating for the heat transfer in a sensor of a temperature monitoring system as may be used in a thermocouple based temperature measurement system. System 806 includes sensor system 805 having sensor 810 residing within user environment 850 of a user application, and the thermal transfer indicia 815 associated with sensor 810. System 806 further includes a thermal transfer compensation device or instrument 822 that may be operably coupled to sensor system 805 for measuring sensor signal 817, e.g., a measurement of the temperature, and retrieving sensor thermal transfer parameters 818 stored by indicia 815 and provided by sensor indicia output signal 820. It should be understood that sensor system 805 and thermal transfer compensation instrument 822 may, in some embodiments, be separate components as shown in FIG. 8B, and in other embodiments be combined into a single physical and/or operational package. By way of example, sensor system 805 and thermal transfer compensation instrument 822 may be components of an active structure panel (ASP) or similar arrangement or packaging. In another exemplary embodiment, sensor system 805 would be configured to be compatible with an interface, a plug, or connector arrangement to thermal transfer compensation instrument 822. This may be a custom interface or may be compliant with a known standard, such as the defined by a standards organization like IEEE (e.g., IEEE P1451.4) or may be a vendor proprietary or collaborative standard such as the National Instruments collaborative effort.

Thermal transfer compensation device 822 uses sensor thermal transfer parameters 818, optionally together with a user application and environment input 830 to construct a thermal transfer model or function, and compensate sensor signal 817. In one preferred optional embodiment, user application and environment input 830 may be input directly by a user of the thermal transfer compensation device 822 as indicated in FIG. 8B. In such an embodiment, one or more user application and environment inputs 830 may be input and stored in a memory (not shown) of the thermal transfer compensation device 822 for selection and use by the user and the thermal transfer compensation device 822. In another preferred optional embodiment, user application and environment input 830 may be input and stored in thermal transfer indicia 815 and transferred to thermal transfer compensation device 822. In some embodiments, a portion or subset of user application and environment inputs 830 may be stored in thermal transfer indicia 815, for example, a portion related to a general set or type of user application or environment. In such a case, another portion of the user application and environment inputs 830 may be directly input into thermal transfer compensation device 822 including generally applicable data, or specific application data, either of which may compliment and provide for a full set of user application and environmental input 830 for use by thermal transfer compensation device 822.

After receiving the senor thermal transfer parameters and the optional user application and environment input 830, thermal transfer compensation device 822 then provides a temperature measurement error compensated signal 890 in accordance with the heat transfer profile of sensor 810 as a function of the temperature based on the user application and environmental inputs 830. Temperature measurement error compensated signal 890 may include other components, data or information and include correction for the thermal error.

FIG. 8C, for example, illustrates an exemplary temperature measurement error compensation system 807 for compensating for the heat transfer in sensor 810 of a temperature monitoring system in accordance with some embodiments of the invention such as may be used in a variety of sensor measurement systems, including a thermocouple based temperature measurement system. System 807 of FIG. 8C includes sensor system 805 having sensor 810 residing within user environment 850 of a user application, and thermal transfer indicia 815 associated with sensor 810. System 807 further has the thermal transfer compensation device 822 that is operably coupled to sensor system 805 that measures sensor signal 817 (e.g., a measurement of the temperature), and retrieves sensor thermal transfer parameters 818 stored by thermal transfer indicia 815 and provided by sensor indicia output signal 820.

Thermal transfer compensation device 822 of FIG. 8C uses sensor thermal transfer parameters 818, optionally together with user application and environment inputs 830 to construct or reconstruct a thermal transfer model or function, and compensate sensor signal 817 of sensor 810. Device 822 then provides a temperature measurement error compensated signal 890 in accordance with the heat transfer profile of sensor 810 as a function of the temperature based on the user application and environmental inputs 830 and sensor specific inputs 915 supplied by the manufacturer of sensor 810.

Thermal transfer compensation system 807 may further include a thermal transfer model 835 for characterizing and modeling the heat transfer between sensor system 805 and user environment 850 and application surrounding sensor system 805 of a temperature measurement system. Optionally, thermal transfer model 835 is operable to receive user application and environment inputs 830, and generate a functional relationship or thermal transfer function 840 based on sensor thermal transfer parameters 818 stored by thermal transfer indicia 815. Functional relationship 840, for example, may be represented as a thermal transfer functions [3] and [4] as previously identified. Although this is one exemplary model, various other models may be employed and are contemplated as falling within the scope of embodiments of the invention.

The result of the thermal transfer modeling of the input to thermal transfer model 835 may provide a thermal transfer function 840 for the particular sensor type as a function of heat transfer (e.g., a function of temperature and heat transfer for a thermal sensor). Thermal transfer parameters associated with the thermal transfer function and the user selected sensor, are then used by compensation device 822 to compensate the errors in the measurement signal 817 to provide the temperature measurement error compensated signal 890.

In this way, thermal transfer compensation device 822 that may be operably coupled to sensor system 805, measures sensor signal 817 (e.g., a measurement of the temperature), and retrieves parameters 818 representing thermal transfer function 840 stored by thermal transfer indicia 815. Thermal transfer compensation device 822 then uses various thermal parameters to reconstruct the thermal transfer function and compensate signal 817 of sensor 810. Device 822 then provides a temperature measurement error compensated signal 890 in accordance with the heat transfer profile of sensor 810 as a function of the temperature based on the user application and environmental inputs 830 and sensor specific inputs 915 supplied by the manufacturer.

Various elements of the temperature measurement error compensation systems 806 and 807 may best be appreciated in the examples of the following figures. It should be further noted, that in the context of the various embodiments of the invention and in the following examples, provision is made for soliciting thermal transfer related data from the user rather than the generation of such data. The models discussed in the following aid in providing the parameters for compensation rather than the complete thermal modeling of the thermal application.

Figure 9A:
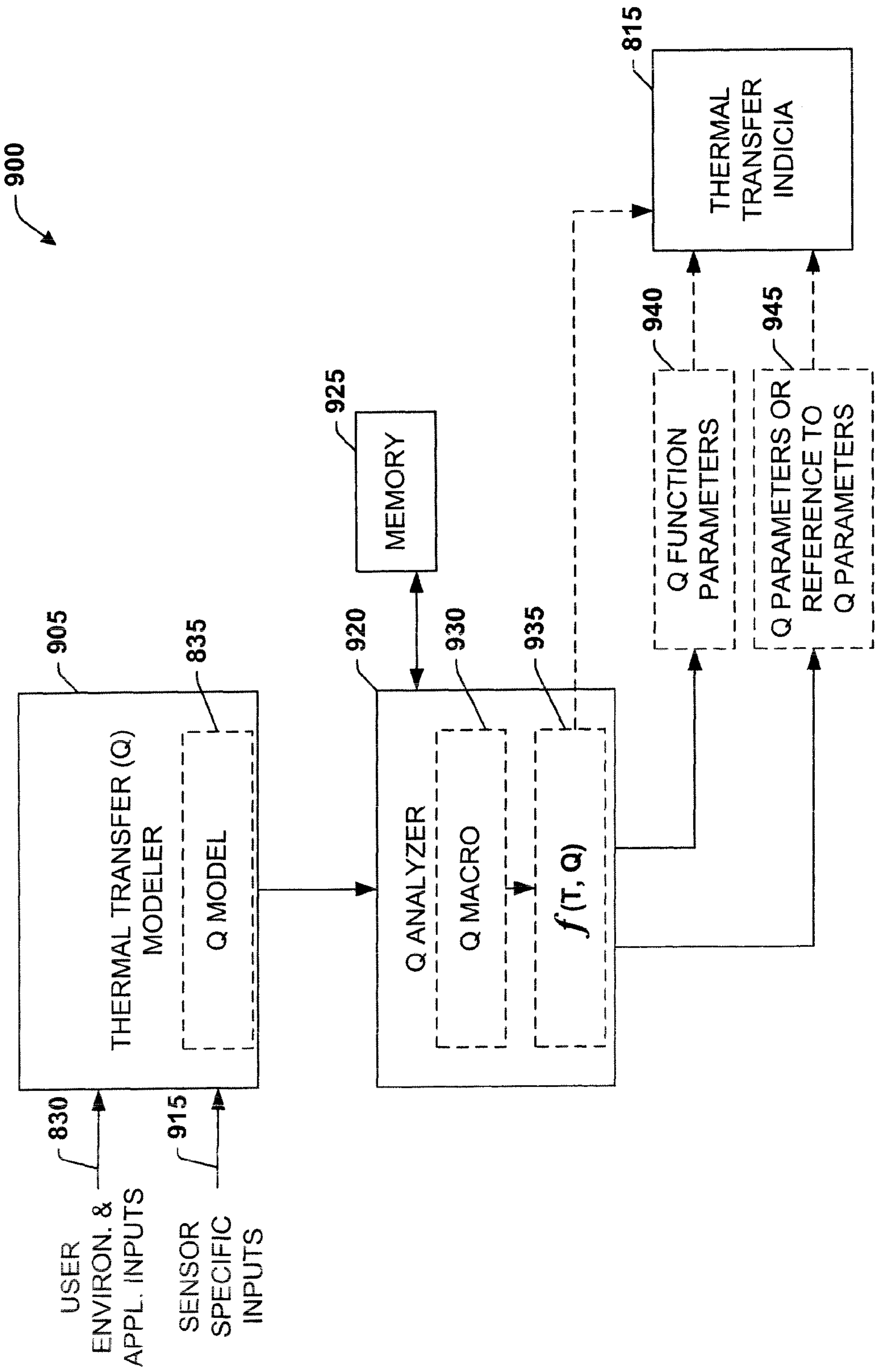
FIG. 9A is a block diagram illustrating an exemplary thermal transfer model for obtaining a thermal transfer function and a thermal transfer indicia associated with the sensor as applied to the user's environment and application, combined with sensor specific information as a function of the heat transferred in the system of FIG. 8 in accordance with one embodiment of the invention.

FIG. 9A, for example, is a block diagram of an exemplary thermal transfer model 900 similar to model 835 of FIG. 8 according to one embodiment of the invention. Model 900 of FIG. 9A may be used to obtain a thermal transfer function and thermal transfer indicia associated with a specific sensor as a function of temperature and the user's application and environment surrounding a sensor in the case of a thermal sensor. Model 900 comprises a thermal transfer modeler 905 operable to receive the user environmental and application inputs 830 (e.g., user supplied information from a programmed list of questions or prompts) and manufacturer sensor specific inputs 915 (e.g., a heat transfer profile from the manufacturer of a specific sensor), and to generate a thermal transfer model (e.g., $Q^{\bullet}=G^{*}\Delta T$) 835 operably coupled to a heat transfer analyzer 920. Model 900 may also include empirical and/or predetermined data.

Heat transfer analyzer 920 may use, for example, an algorithm or macro 930 in a computer program to analyze thermal transfer model 835, temporarily stored in a memory 925 to generate a thermal transfer function 935. Analyzer 920 may also utilize empirical and/or predetermined data. Thermal transfer function 935 is output from analyzer 920, for example, as the thermal transfer function itself 935, as thermal conductor parameters 940 (e.g., $G_a$, $G_{s1}$) of thermal transfer function 935, as a set of thermal transfer parameters or a reference to the parameters 945. The output of analyzer 920 is then stored as thermal transfer indicia 815 in an indicia storage system or device (not shown) associated with the specific user selected sensor (not shown). Indicia storage system may include an EPROM, an EEPROM, a barcode, an RFID tag, a virtual storage location on a network, a memory device, a computer readable medium, a computer disk, and another such storage device operable to communicate information of the sensor.

Figure 9B:
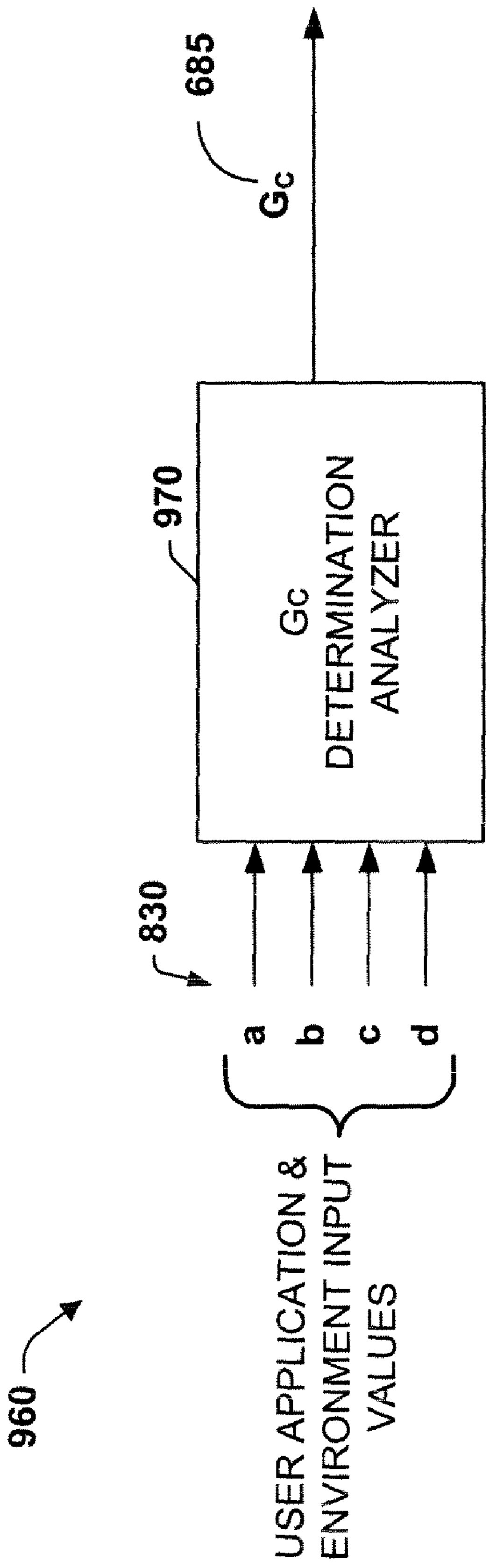
FIG. 9B is a block diagram of an exemplary system for determining the thermal contact resistance, GC, between the outer sheath of the sensor and a target thermal source using various user input parameters in the thermal transfer model of the system of FIG. 8 in accordance with one embodiment of the invention.

FIG. 9B illustrates an exemplary system for determining the thermal contact resistance, $G_c$ 685 between an outer sheath of a sensor and a target thermal source using various user input parameters in the thermal transfer model of the system of FIGS. 8A, 8B and 8C in some embodiments of the invention.

In one embodiment, the thermal model includes three parameters to provide for the compensation for heat transfer in a measurement system. As indicated in connection with the thermal models of FIGS. 5-8, these parameters may be represented by the series heat transfer conductors: $G_a$ 565, $G_c$ 685, and $G_{s1}$ 575 in the exemplary heat transfer function of formula [4].

Of these parameters $G_{s1}$ 575 and $G_a$ 565 and the geometry of the sensor are typically known at the time of manufacture as predetermined sensor specific information and are independent of application conditions. Further, $G_c$ 685 may be calculated by providing a sensor user (e.g., customer, applications engineer) compensation data unique to the sensor itself plus other such contributory information together with the user inputs to help define and model the user application. With these user supplied inputs, application unique compensation of the sensor output or signal may be accomplished.

For example, in FIG. 9B, an exemplary system 960 analyzes a variety of user application and environmental inputs 830 in determining $G_c$ 685 by analyzer 970. User inputs 830 may be the source temperature (T source), ambient temperature (T ambient), the geometry of a mounting hole for the sensor, the hole depth, the hole surface finish, how tight the sensor fits, as well as anything specific to the application that affects contact resistance between the sensor and the thermal source part. When the temperature difference is greater (T source−T ambient), and when a sensor mounting hole is shallow, the sensor environment is more susceptible to thermal mounting error. For the sensor, large diameters, lower resistance materials (higher thermal conductivity materials), larger cross-sectional area of materials all affect its thermal mounting error. In addition, the location of the sensing element with respect to the sensor tip, and contact resistances between the exterior of the sensor package and the internal sensing element also affect the sensor thermal mounting error and thus the value determined for $G_c$ 685.

Figure 10:
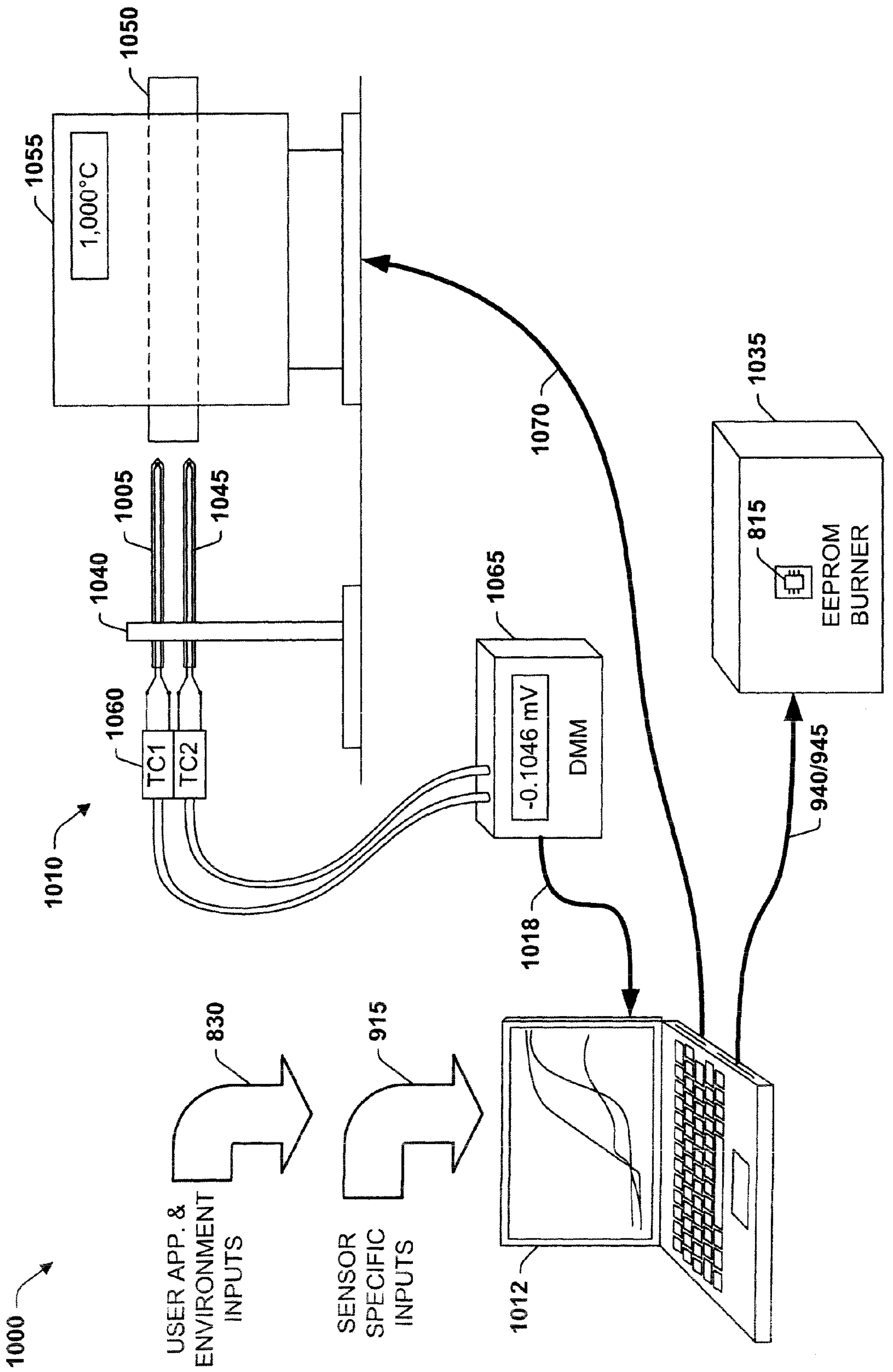
FIG. 10 is a diagram illustrating an exemplary thermocouple thermal transfer modeling system for processing user and sensor specific input and thermal profile information into thermal transfer parameters of a sensor stored as thermal transfer indicia in a memory device in accordance some embodiments of the invention.

FIG. 10 illustrates an exemplary thermocouple thermal transfer modeling system 1000 for processing sensor specific inputs and thermal profile information into thermal transfer parameters of a sensor according to one embodiment of the invention. The parameters may be stored as thermal transfer indicia in a memory device in accordance some embodiments of the invention as described in FIGS. 8-9. Optionally, system 1000 supports application and environmental inputs from a user of the sensor.

Figure 14:
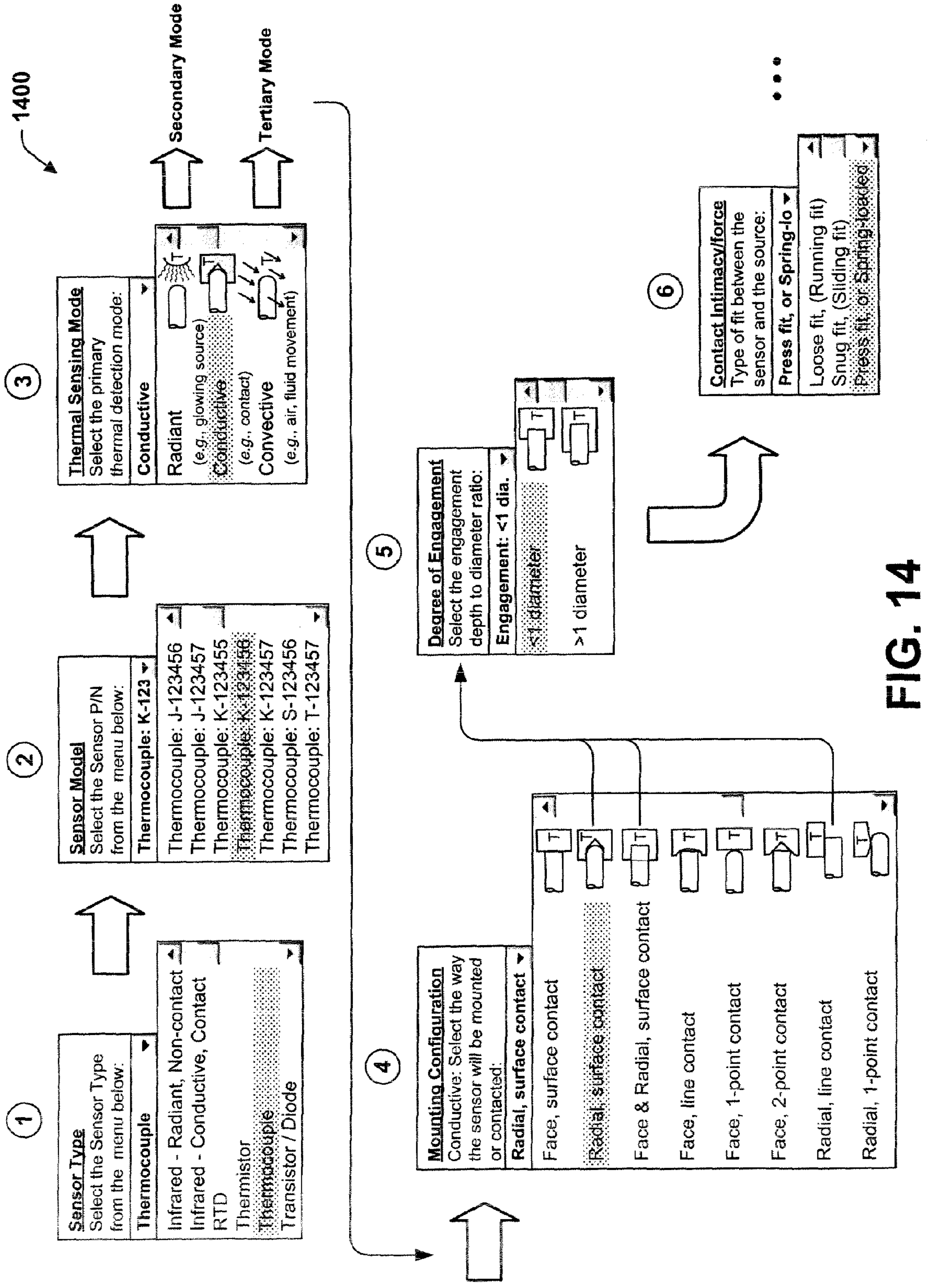
FIG. 14 is a computer window sequence of an exemplary user input computer program to prompt the user for information of the specific sensor and environmental conditions in the user's sensor application to determine the thermal transfer characteristics in a temperature measurement system in accordance with one aspect of the invention.

In the exemplary modeling system 1000 of FIG. 10, a particular sensor type or family of sensors is manufactured having similar thermal profile characteristics. A sensor (e.g., thermocouple) 1005 may be thermally profiled in a test set-up such as thermal profiler 1010. Modeling system 1000 includes a computer 1012 or another such analyzer that receives the sensor specific inputs 915 associated with the type of sensor 1005. Optionally, system 1000 supports receiving user application and the environment inputs 830 from a sensor user together with the sensor specific inputs 915. Based on an analysis of the user application and environment inputs 830, the sensor specific inputs 915, and a thermal profile 1018 from profiler 1010, computer 1012 generates and stores a thermal transfer model and a thermal transfer function. FIG. 14 will later illustrate one such user input or information harvesting methodology applying a specialized computer modeling program. Alternatively, the thermal model can be partially constructed with the predetermined sensor specific inputs 915 and subsequently completed at application installation by a user supplying the application and/or environment inputs 830.

Generated by the computer 1012 of FIG. 10, the thermal transfer function may be further processed to obtain thermal transfer parameters 940 or reference to parameters 945 of the thermal transfer function, a reference to an external location where the parameters are stored, or a location where some portion of the thermal transfer function is stored. The thermal transfer parameters 940 or reference to parameters 945 are then programmed or otherwise stored by the thermal transfer indicia 815 (e.g., an EEPROM, EPROM, memory device, memory location on a network, an RFID tag, or a barcode) using, for example, an EEPROM programmer or burner 1035.

In the thermal profiler 1010, for example, thermocouple sensor 1005 may be mounted on a test stand 1040 along with a known reference standard such as reference thermocouple 1045 for reading the true temperature in a ceramic isolation sleeve 1050 within a thermal test chamber 1055. Sensor 1005 together with reference sensor 1045 may be coupled via plugs and receptacles 1060 to a measuring device 1065 (e.g., a DMM, or ADC) into computer 1012. Computer 1012 along with, for example, a software macro or specialized program, and the computer's memory is used to generate and store the thermal profile of sensor 1005 with respect to temperature and various environmental characteristics associated with the thermal transfer function of thermal sensor 1005. Thermal test chamber 1055 may also receive a temperature control 1070 from computer 1012 for accurate regulation of the temperature in thermal test chamber 1055. In other embodiments, a sensor may be profiled under a shallow immersion or other mounting arrangement that may represent a user application of the sensor.

Once the thermal transfer information (e.g., via parameters or a mathematical function) has been communicated to the thermal transfer indicia associated with the user's sensor, the information may be used for compensating the output of a temperature measuring device.

Figure 11:
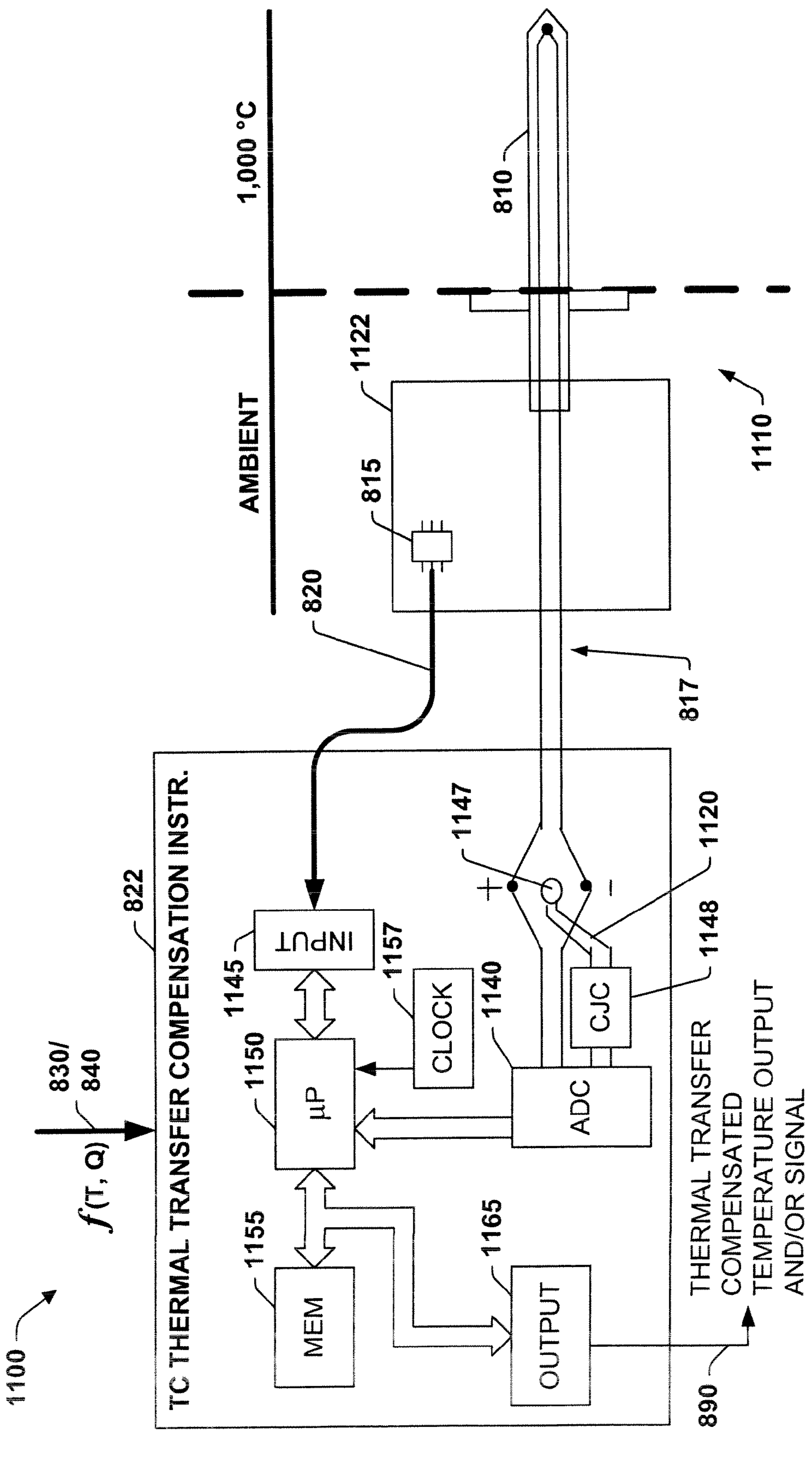
FIG. 11 is a simplified diagram illustrating an exemplary temperature measurement and thermal transfer compensation system for measuring and compensating the output of a TC sensor system having a thermocouple and an associated thermal transfer indicia in accordance with one embodiment of the invention.

For example, FIG. 11 illustrates an exemplary temperature measurement error compensation system 1100 for measuring and compensating the signal of a thermocouple sensor system having a thermocouple and associated thermal transfer indicia in accordance with one embodiment of the invention. A sensor system 1110 comprises a thermocouple sensor 810 and an associated thermal transfer indicia 815 (e.g., an EEPROM memory) housed together in a connector housing 1122. Sensor 810 and indicia 815 are linked by way of specific parameters associated with or representing the thermal transfer characteristics of sensor 810 and stored by indicia 815. With these parameters, a user with a particular environment in a particular user application can model the thermal transfer of sensor 810 for application in the user environment. For example, sensor 810 provides an analog signal 817, while the indicia output signal 820 is provided by the indicia 815 such as an EEPROM memory provides parameters 818. Both are provided to a operably coupled thermocouple thermal transfer compensation device 822. Sensor signal 817 is operably coupled to an analog to digital converter ADC 1140 of compensation device 822 for conversion to a digital signal, while indicia output signal 820 of indicia 815 is input to compensation device 822 via a digital input port 1145 in one of a serial or parallel input formats.

In one exemplary embodiment, a cold junction compensation (CJC) sensor 1147 that may be located within connector housing 1122, may be within Compensation device 822 as shown, or may be within another device or as a standalone component. A CJC sensor signal 1120 of CJC sensor 1147 is operably coupled back to a cold junction compensation circuit 1148 that is then converted to a digital value by the ADC 1140 for presentation to the microprocessor 1150 for cold junction compensation of the sensor signal 1120 based on the temperature measurement at the cold junction.

The exemplary thermocouple thermal transfer compensation device 822 includes a microprocessor 1150 that retrieves (e.g., on power-up of compensation device 822) the parameters from indicia 815 and temperature measurement readings, and stores them in a local memory 1155. Microprocessor 1150 and memory 1155 synchronized by a clock 1157 analyze the temperature measurements with respect to temperature and heat transfer to compensate sensor signal 817 according to the stored thermal transfer parameters of memory 1155 to provide a thermal transfer compensated signal 890 from a communication interface 1165 of the compensation device 822.

For example, the sensing portion of sensor 810 may be placed in a 1,000° C. furnace while the connector housing 1122 generally resides at an ambient temperature outside the furnace, thus thermally protecting indicia 815 and the thermal transfer parameters stored therein.

Optionally, system 1100 supports receiving application and environment inputs 830 and/or thermal transfer function 840 supplied by the user and received into the compensation system 822 for assisting the user in modeling the thermal transfer of sensor 810 to the user's environment.

Figure 12A:
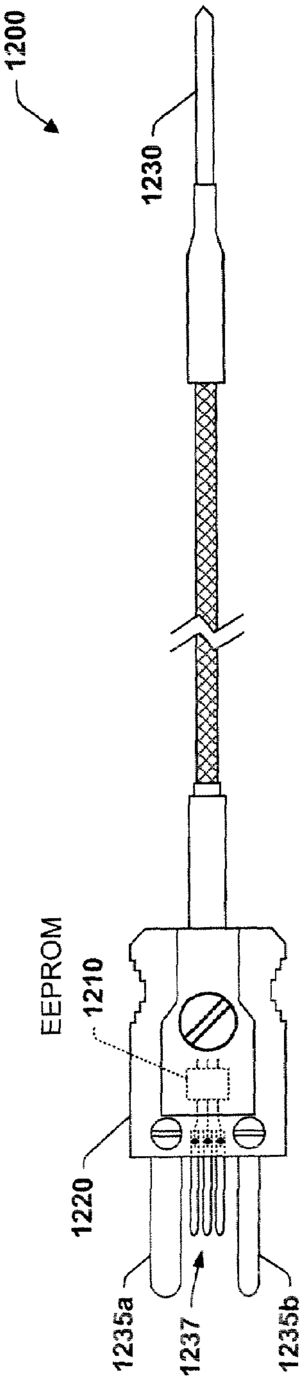
FIG. 12A-12C are diagrams of several exemplary thermocouple sensor systems illustrating various thermal transfer indicia for storing parameters associated with the thermal transfer of a temperature monitoring system in accordance with one embodiment of the invention.
Figure 12B:
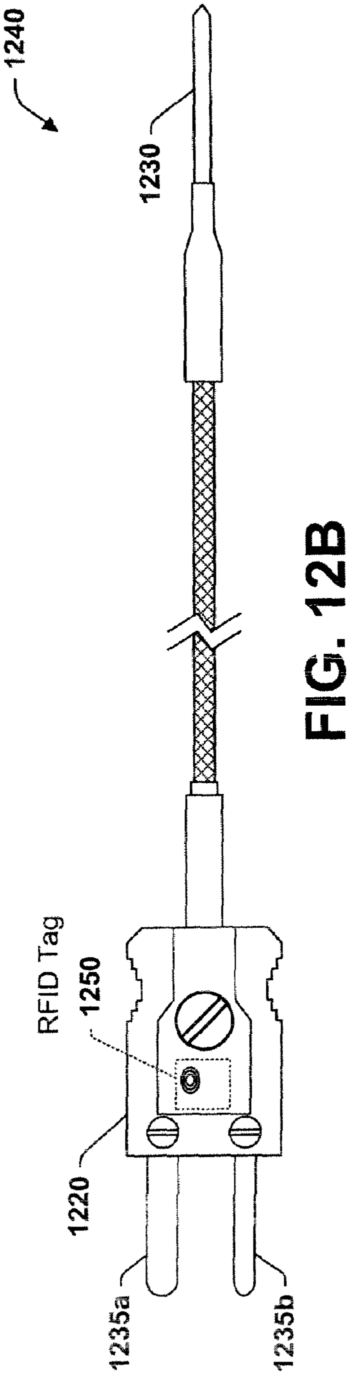
Figure 12C:
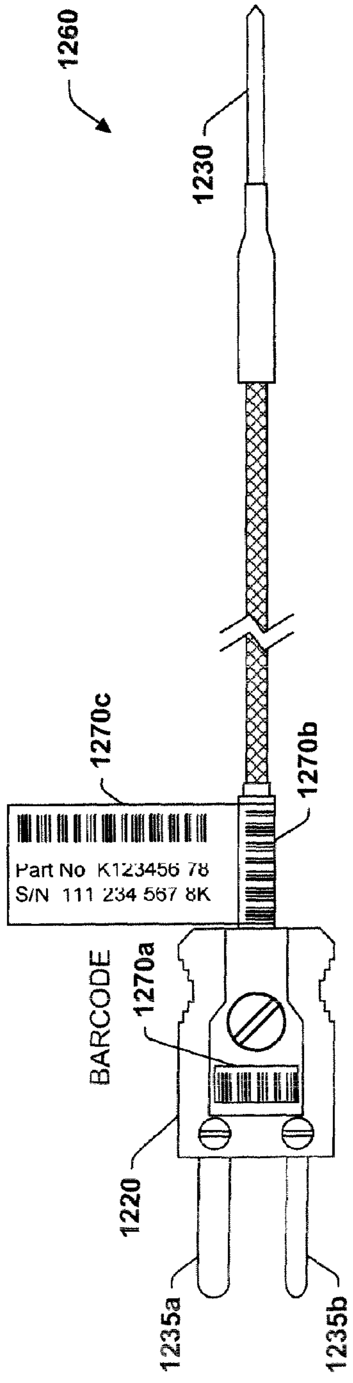

FIGS. 12A-12C illustrate several exemplary sensor systems (e.g., thermocouple sensor systems) utilizing various types of thermal transfer indicia 815 for storing parameters associated with the thermal transfer within a temperature measurement system in accordance with some embodiments of the invention. For example, FIG. 12A illustrates a sensor system 1200 of one exemplary EEPROM thermal transfer indicia 1210 that may be embedded within a connector housing 1220 of sensor system 1200. In the present example, a thermocouple 1230 may be operably coupled within connector housing 1220 to a set of thermocouple connector pins 1235*a* and 1235*b*, while EEPROM 1210 may require, for example, additional EEPROM connector pins 1237 for power and memory access control. An advantage of this type thermal transfer indicia is the direct accessibility of a connected sensor monitoring system to the EEPROM thermal transfer indicia 1210 for immediate and remote retrieval of the stored parameters associated with thermocouple 1230.

FIG. 12B, illustrates another sensor system 1240 having another exemplary thermal transfer indicia 815 comprising a Radio Frequency Identification (RFID) tag 1250 embedded within connector housing 1220. Again RFID thermal transfer indicia 1250 stores the parameters associated with the thermal transfer within a temperature measurement system in accordance with some embodiments of the invention. An advantage of this type thermal transfer indicia is that no additional connector pins are required, the stored parameters may be read from some distance from the sensor and without direct contact to the sensor, and may possibly be read by the sensor monitoring system at short ranges for immediate and remote retrieval of the stored parameters.

FIG. 12C, illustrates yet another exemplary sensor system 1260 having an exemplary barcode thermal transfer indicia 1270 applied, for example, to a label 1270*a* on connector housing 1220, on a shrink wrap label 1270*b*, or as part of another such ID or Serial Number label 1270*c*. Again barcode thermal transfer indicia 1270 stores the parameters associated with the thermal transfer within a temperature measurement system in accordance with some embodiments of the invention. An advantage of this type of thermal transfer indicia is that no additional connector pins are required, it has a low cost, and the stored parameters may be scanned by a conventional barcode reader, and read without direct contact with the sensor for retrieval of the stored parameters. Of course, other types of barcode systems or data matrices may also be utilized as thermal transfer indicia.

Another implementation of the invention provides a method for compensating the thermal transfer within a temperature measurement system as illustrated and described herein, as well as other types of sensor measurement systems having thermal transfer errors.

In one embodiment the method corrects or compensates for sources of thermal error that may occur in sensor measurement systems due to heat transfer between a thermal device such as a sensor and the environment surrounding the sensor in a user application, thereby minimizing variations in the output of the system. One implementation of the invention further accommodates specific thermal device types, environment and application variability by allowing user inputs for the particular sensor type, application environment, mounting configuration, and temperature conditions of a user's/customers' application and the corrections thereof due to thermal error.

Some implementations of the method rely on the expectation that the heat transfer between a thermal device and the environment surrounding the thermal device within a thermal system may be thermally modeled and used as the basis of obtaining a heat transfer function or parameters representing the function utilized to compensate the output or signal of the sensor due to thermal error in the measurement system. For example, in a temperature sensor, the thermal error may be modeled and characterized for one or more test sensors as a function of, for example, temperature and heat transfer between the sensor and the surrounding environment. To compensate the thermal error, the thermal transfer function would then be the change in output as a function of temperature for a specified sensor, environment, application, and temperature condition. The thermal transfer function may be recorded or stored in a variety of formats, for example, data tables, and parameters representing the mathematical heat transfer as a function of temperature, in a variety of media or devices, for example, EEPROM, RFID tags, and barcode labels comprising a thermal transfer indicia. A sensor system is formed when the thermal transfer function or parameters stored by the thermal transfer indicia is associated with a sensor of the same type which will be utilized in the user's specified application environment, mounting configuration, and temperature conditions.

In one implementation of a method of the invention, when a thermal device is used and monitored (e.g., in the thermal transfer compensation and measurement system of FIG. 10), the thermal transfer function (e.g., a set of parameters) may be used to compensate the thermal error in the thermal device measurements, signals, and/or outputs.

Figure 13:
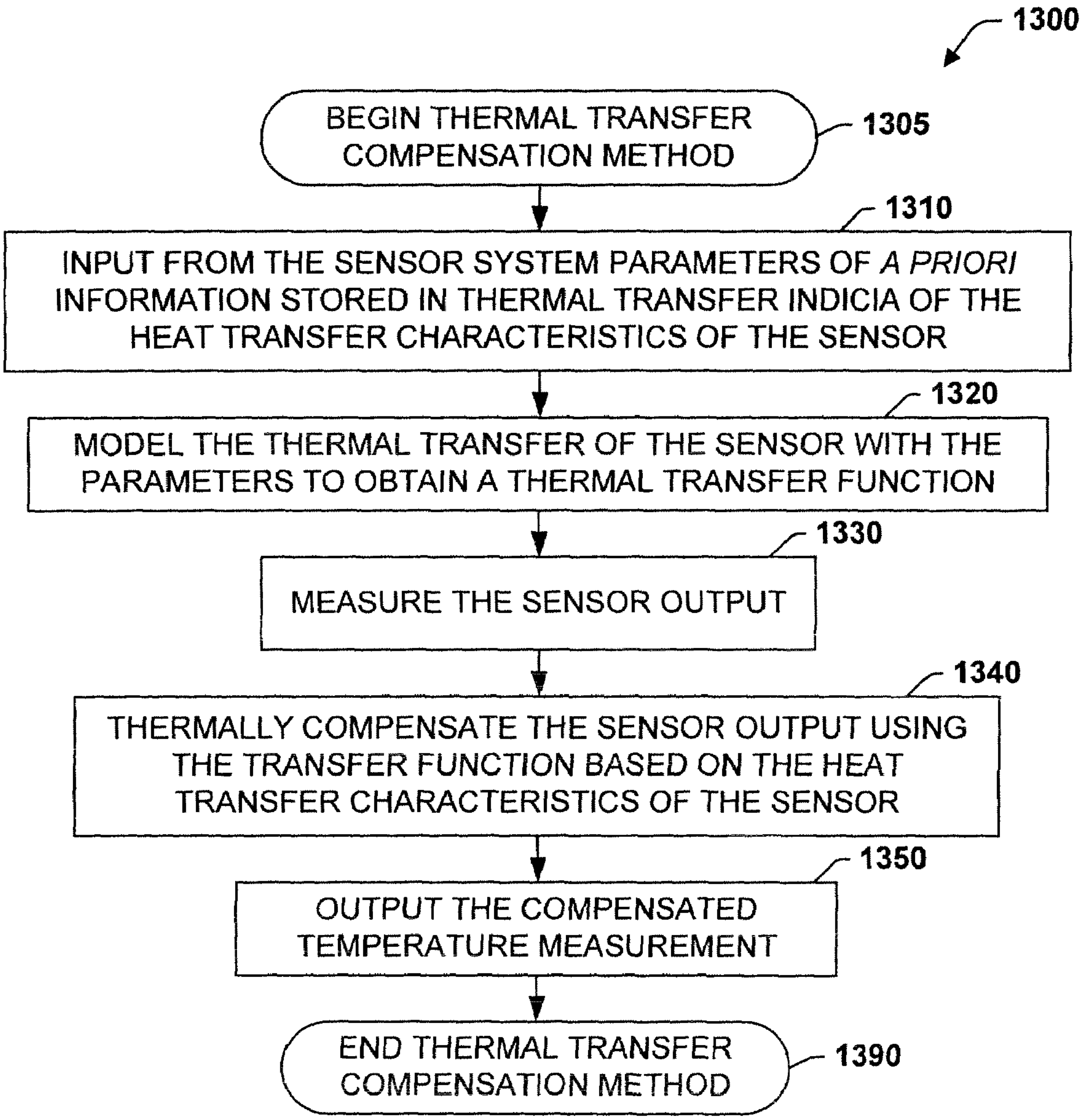
FIG. 13 is a flow chart illustrating a method of compensating for the thermal transfer in a sensor measurement system in accordance with several aspects of the invention.

Referring now to FIG. 13, an exemplary method 1300 is illustrated for a temperature measurement error compensation system used for compensating the thermal error in the system in accordance with several aspects of the invention. For example, such a compensation system may be similar to the system of FIG. 11, or the compensation systems of FIGS. 8B and 8C. Exemplary method 1300 compensates for the error in the output of a thermal device in a temperature measurement system (806, 807, and 1100). System 1300 uses thermal transfer parameters of predetermined information stored by thermal transfer indicia associated with the heat transfer characteristics of the thermal device. A thermal model utilizes the parameters to form a thermal transfer function of the heat transfer characteristics of the thermal device. A thermal device temperature measurement is obtained and the output is compensated according to the thermal transfer function from the thermal model.

While method 1300 and other methods herein are illustrated and described below as a series of acts or events, it will be appreciated that embodiments of the invention are not limited by the illustrated ordering of such acts or events. For example, some acts may occur in different orders and/or concurrently with other acts or events apart from those illustrated and/or described herein, in accordance with one embodiment of the invention. In addition, not all illustrated operations or steps may be required to implement a methodology in accordance with some embodiments of the invention. Furthermore, method 1300 according to some embodiments of the invention may be implemented in association with the compensation systems, control systems, elements, and devices illustrated and described herein as well as in association with other systems, elements, and devices not illustrated.

Exemplary thermal transfer compensation method 1300 of FIG. 13 begins at operation 1305. Initially at operation 1310, thermal device system parameters of predetermined information stored by the thermal transfer indicia 815 of the heat transfer characteristics of thermal device 810 is input, for example, from the manufacturer of the thermal device 810 to the thermal compensation device 822. At operation 1320, the thermal transfer parameters (e.g., signal 820 containing parameters 818) are thermally modeled and analyzed to obtain a thermal transfer function of the change in output as a function of temperature for a specified thermal device 810. The function or parameters representing the thermal transfer function may be stored in, for example, a local memory 1155 of the thermal transfer compensation device 822.

At operation 1330, temperature sensor signal 817 is measured. At operation 1340, sensor signal 817 is compensated using the thermal transfer function based on the heat transfer characteristics of the sensor. Finally, at operation 1350 a compensated temperature signal 890 that includes correction for the thermal error in signal 817 of sensor 810.

Thereafter, the thermal transfer compensation method 1300 ends at operation 1390. Thus, one exemplary method of the invention thermally models the heat transfer of a sensor from parameters associated with the thermal transfer function stored by a thermal transfer indicia associated with the sensor based on the heat transfer characteristics of a specific sensor type. The method also compensates the thermal error reflected in the output of the sensor using the parameters stored by the thermal transfer indicia integral to the sensor.

Optionally, other implementations of the invention include receiving application and environment inputs 830 or a function of the thermal transfer supplied by the user. These inputs may be, for example, received into the compensation system 822 for assisting the user in modeling the thermal transfer of a specific sensor utilized within the user's environment.

FIG. 14 illustrates an exemplary window sequence of a computer thermal modeling program 1400 for harvesting thermal information from a thermal device user/customer. Thermal modeling program 1400 may also generate a thermal model based on the user information and a knowledge base embedded within the program of the available thermal device types from the thermal device manufacturer.

The exemplary thermal modeling program 1400 prompts the user for information such as a thermal device type (e.g., RTD, thermocouple, and thermistor), a thermal device model (e.g., K-type thermocouple model #K-123456), and a thermal sensing mode (e.g., Radiant, Conductive, or Convective type sensing). Sensing may be further subdivided into primary, secondary and tertiary sensing modes to account for applications including more than one type of sensing, e.g., primary=Conductive, secondary=Radiant as illustrated in FIGS. 7A and 7B. Modeling program 1400 may also prompt for information such as a mounting configuration (e.g., Face mounted with a single point contact such as 310 of FIG. 3, or Radial line contact such as FIG. 4) and a degree of engagement (e.g., less than 1 diameter, or greater than 1 diameter). Note, that window (5) may be programmed to prompt the user for this information only if a mounting configuration that has a "depth of engagement" is selected in window (4), such as "Face, surface contact", "Face & Radial, surface contact", or "Radial, line contact," etc. Modeling program 1400 may also prompt for a contact intimacy or force (e.g., loose, snug, or press fit of thermal device in mating application thermal source) or alternately the contact force may be quantified.

Other characteristics that may be harvested by modeling program 1400 include a contact surface finish, a contact surface area or length, a distance of contact from temperature sensing element, and a thermal device or tip sensitivity.

Further, any other environmental conditions in the thermal device user's application that are useful to determine the thermal transfer characteristics between the thermal device and the thermal environment surrounding the thermal device in the temperature measurement system may be included in the thermal model in accordance with one aspect of the invention. After the user provides such information (e.g., in association with an interactive website), the appropriate thermal transfer compensation data can be downloaded to the compensation device or instrumentation 822. Alternatively, a thermal model provided by the indicia associated with the thermal device can be employed at the instrumentation and can be used to complete the compensation model.

Although several exemplary thermocouple sensing devices and methods of thermal compensation have been used in a conductive sensing mode to describe the thermal transfer characteristics of the exemplary thermal device and the thermal environment surrounding the thermal device in the thermal modeling program and temperature compensation system, any type of thermal device may be thermally modeled and is contemplated in one context of the invention.

When introducing aspects of the invention or embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several aspects of the invention are achieved and other advantageous results attained. As various changes could be made in the above exemplary constructions and methods without departing from the scope of the invention, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps may be employed.

What is claimed is:

1. A method of compensating a temperature measurement of a thermal device in a user environment as a function of a thermal transfer of the thermal device in a temperature measurement system, the method comprising:

- inputting thermal transfer parameters associated with heat transfer characteristics of the thermal device;
- obtaining a single temperature measurement of a target thermal source to be measured based on an output of the thermal device that is exposed to the target thermal source during the temperature measurement;
- storing the input thermal transfer parameters in a thermal transfer indicia, wherein the thermal transfer indicia is associated with an indicia storage system communicatively linked to the thermal device;
- retrieving the thermal transfer indicia from the indicia storage system; and
- using the thermal transfer indicia to compensate for measurement errors in the single temperature measurement of the target thermal source to be measured as a function of the thermal transfer function between the thermal device and the user environment based on one of a plurality of predetermined specific thermal environments and one of a plurality of predetermined specific thermal errors associated with the thermal device, wherein the plurality of predetermined specific thermal errors are predetermined sensor specific information and are independent of application conditions.

2. The method of claim 1, further comprising:

inputting thermal device information associated with the output of the thermal device as a function of the thermal transfer based on a thermal transfer characteristic;

modeling the thermal transfer characteristic to generate the thermal transfer function including thermal transfer parameters; and storing thermal transfer parameters in a thermal transfer indicia associated with the thermal device.

3. The method of claim 1 wherein the thermal transfer parameters associated with the thermal transfer function are fitted to at least one of a mathematical data coefficient and a statistically generated parameter.

4. The method of claim 1 wherein the thermal transfer parameters are a two dimensional matrix of thermal transfer data representative of the thermal transfer between the thermal device and the user environment.

5. The method of claim 1 wherein the thermal transfer parameters are fitted mathematical data coefficients associated with at least one mathematical functions representative of one or more segments of the thermal transfer function.

6. The method of claim 1 wherein the thermal device includes a thermocouple.

7. The method of claim 1 wherein the thermal device is selected from the group consisting of a resistance temperature detector, a thermistor, a diode, and a transistor.

8. The method of claim 1, further comprising:

inputting thermal device information associated with the output of the thermal device as a function of the thermal transfer based on a thermal transfer characteristic;

modeling the thermal transfer characteristic to generate the thermal transfer function; and referencing the thermal transfer parameters in a thermal transfer indicia.

9. The method of claim 8 wherein modeling of the thermal transfer characteristic includes at least one of a conductive thermal model, a convective thermal model, and a radiative thermal model.

10. The method of claim 1, further comprising thermally modeling the thermal transfer function, said thermally modeling including:

analyzing a user application, environment inputs, and a thermal device manufacturer's mounting characteristics and deriving the thermal transfer function as a function of a relationship of a temperature and a heat transfer characteristic; and storing thermal transfer parameters associated with the thermal transfer function.

11. The method of claim 1 wherein the indicia storage system is selected from the group consisting of an EPROM, an EEPROM, a barcode, an RFID tag, a virtual storage location on a network, a memory device, a computer readable medium, a computer disk, and a storage device operable to communicate information of the thermal transfer related to the thermal device.

12. The method of claim 11, further comprising:

generating the thermal transfer indicia associated with the thermal device, said generating including inputting information related to at least one of the user environment and a user application;

inputting thermal device information associated with the output of the thermal device as a function of a thermal transfer characteristic;

modeling the thermal transfer between the thermal device and the user environment to determine the thermal transfer function; and storing the thermal transfer parameters in the thermal transfer indicia associated with the thermal device.

13. A method of compensating a temperature measurement of a thermal device in a user environment as a function of a thermal transfer of the thermal device in a temperature measurement system, the method comprising:

inputting thermal transfer parameters associated with heat transfer characteristics of the thermal device;

obtaining a single temperature measurement of a target thermal source to be measured;

storing the input thermal transfer parameters in a thermal transfer indicia, wherein the thermal transfer indicia is associated with an indicia storage system selected from the group consisting of an EPROM, an EEPROM, a barcode, an RFID tag, a virtual storage location on a network, a memory device, a computer readable medium, a computer disk, and a storage device operable to communicate information of the thermal transfer related to the thermal device;

retrieving the thermal transfer indicia from the indicia storage system; and using the thermal transfer indicia to compensate the single temperature measurement of the target thermal source to be measured as a function of the thermal transfer function between the thermal device and the user environment based on one of a plurality of predetermined specific thermal environments and one of a plurality of predetermined specific thermal errors associated with the thermal device, wherein the plurality of predetermined specific thermal errors are predetermined sensor specific information and are independent of application conditions.

14. The method of claim 13 wherein the thermal transfer parameters associated with the thermal transfer function are fitted to at least one of a mathematical data coefficient and a statistically generated parameter.

15. The method of claim 13 wherein the thermal transfer parameters are a two dimensional matrix of thermal transfer data representative of the thermal transfer between the thermal device and the user environment.

16. The method of claim 13, further comprising thermally modeling of the thermal transfer function, said thermally modeling including:

analyzing a user application, environment inputs, and a thermal device manufacturer's mounting characteristics and deriving the thermal transfer function as a function of a relationship of a temperature and a heat transfer characteristic.

17. A method of compensating for sources of error in a measurement system associated with a device in a user environment as a function of a thermal transfer of the device, the method comprising:

inputting thermal transfer parameters associated with characteristics of the device;

obtaining a single temperature measurement of a target thermal source to be measured based on an output of the device that is exposed to the target thermal source;

storing the input thermal transfer parameters in a thermal transfer indicia;

retrieving the thermal transfer indicia; and using the thermal transfer indicia to compensate for measurement errors in the single temperature measurement of the target thermal source to be measured as a function of the thermal transfer function between the device and the user environment based on one of a plurality of predetermined specific thermal environments and one of a plurality of predetermined specific thermal errors associated with the device, wherein the plurality of predetermined specific thermal errors are predetermined sensor specific information and are independent of application conditions.

18. The method of claim 17, wherein the thermal transfer indicia is associated with an indicia storage system selected from the group consisting of an EPROM, an EEPROM, a barcode, an RFID tag, a virtual storage location on a network, a memory device, a computer readable medium, a computer disk, and a storage device operable to communicate information of the thermal transfer related to the device.

19. The method of claim 17 wherein the thermal transfer parameters associated with the thermal transfer function are fitted to at least one of a mathematical data coefficient and a statistically generated parameter.

* * * * *